United States Patent
Kawashima

(10) Patent No.: US 7,848,631 B2
(45) Date of Patent: Dec. 7, 2010

(54) IMAGING APPARATUS AND METHOD FOR CONTROLLING THE SAME

(75) Inventor: Toru Kawashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 287 days.

(21) Appl. No.: 12/050,647

(22) Filed: Mar. 18, 2008

(65) Prior Publication Data

US 2008/0260374 A1    Oct. 23, 2008

(30) Foreign Application Priority Data

Apr. 19, 2007   (JP) ............................... 2007-110834

(51) Int. Cl.
    *G03B 7/083*    (2006.01)
(52) U.S. Cl. ...................... 396/231; 396/247
(58) Field of Classification Search ................. 396/225, 396/231, 247
    See application file for complete search history.

(56) References Cited

U.S. PATENT DOCUMENTS

| | | | |
|---|---|---|---|
| 4,112,446 A * | 9/1978 | Numata et al. ............... | 396/231 |
| 4,210,394 A * | 7/1980 | Sato et al. .................... | 396/231 |
| 4,462,672 A * | 7/1984 | Kurosu et al. ............... | 396/231 |
| 5,541,706 A * | 7/1996 | Goto ........................... | 396/231 |
| 5,940,640 A * | 8/1999 | Karasawa .................... | 396/301 |
| 6,812,965 B1 * | 11/2004 | Kijima et al. ............... | 348/312 |

FOREIGN PATENT DOCUMENTS

| | | |
|---|---|---|
| JP | 58-149027 A | 9/1983 |
| JP | 6-026895 A | 7/1994 |
| JP | 2001-21555 A | 1/2001 |
| JP | 2001-023220 A | 1/2001 |
| JP | 2005-283897 A | 10/2005 |

* cited by examiner

*Primary Examiner*—W. B. Perkey
*Assistant Examiner*—N. Reisner
(74) *Attorney, Agent, or Firm*—Canon U.S.A., Inc. I.P. Division

(57) ABSTRACT

An imaging apparatus includes an image sensor configured to capture an image of an object, a mechanical shutter including a second curtain and a second-curtain holding mechanism configured to electromagnetically hold the second curtain at an initial position prior to a travel, a first temperature sensor disposed within a predetermined range from the second-curtain holding mechanism, a second temperature sensor disposed outside the predetermined range from the second-curtain holding mechanism, a determination unit configured to determine an exposure time for the image sensor according to a brightness of the object, an adjustment unit configured to adjust the exposure time if a temperature difference between temperatures detected by the first and second temperature sensors is greater than a predetermined threshold, and an exposure control unit configured to perform exposure control for the image sensor based on the exposure time adjusted by the adjustment unit if the temperature difference is greater than the predetermined threshold.

21 Claims, 26 Drawing Sheets

IMAGING APPARATUS AND METHOD FOR CONTROLLING THE SAME

BACKGROUND OF THE INVENTION

1. Field of the Invention

The present invention relates to an imaging apparatus and a method for control the imaging apparatus, and more particularly relates to an imaging apparatus including a mechanical shutter and a control method for the same.

2. Description of the Related Art

As discussed in Japanese Utility Model Publication No. 6-26895, a direct-holding type focal-plane shutter holds first and second curtains of a shutter in a charge state by energizing electromagnets corresponding to the first and second curtains and controls an exposure time by successively stopping energizing respective electromagnets.

As discussed in Japanese Patent Application Laid-Open No. 2005-283897, there is a direct-holding type focal-plane shutter that can reduce electric power consumption by changing a power voltage during energization control for the electromagnets.

Furthermore, as discussed in Japanese Patent Application Laid-Open No. 58-149027, an electromagnetically-driven shutter includes a temperature detector that measures the temperature of a shutter blade driving coil and a reference voltage generation circuit that generates a corrected reference voltage according to a temperature change in the shutter blade driving coil. The exposure time is appropriately controlled based on the corrected reference voltage.

Furthermore, as discussed in Japanese Patent Application Laid-Open No. 2001-215555 and Japanese Patent Application Laid-Open No. 2001-23220, there is a conventional camera including an image sensor (e.g., a charge coupled device (CCD) sensor or a complementary metal-oxide semiconductor (CMOS) sensor) that enables a user to view an object displayed on a monitor (e.g., liquid crystal display (LCD)) in a state where a first curtain opens an aperture of the shutter while a second curtain is continuously held. This function is generally referred to as "electronic viewfinder (EVF)", and an image displayed via the EVF is referred to as "live view."

However, if the focal-plane shutter discussed in Japanese Utility Model Publication No. 6-26895 is incorporated in an imaging apparatus having an EVF discussed in Japanese Patent Application Laid-Open No. 2001-215555 or Japanese Patent Application Laid-Open No. 2001-23220, the following problems arise.

A monitor display, when executed, requires continuously energizing the electromagnet that holds the second curtain. Therefore, not only electric power consumption increases but also the departure timing of the electromagnet changes due to heat generation in the electromagnet. Thus, the accuracy in exposure control deteriorates. Furthermore, for a similar reason, the accuracy in exposure control deteriorates in a bulb shooting operation, which requires a long time exposure.

The electric power consumption and heat generation in the electromagnet can be reduced if the focal-plane shutter discussed in Japanese Patent Application Laid-Open No. 2005-283897 is used. However, the cost increases because a dedicated circuit is required to switch the voltage applied to the electromagnet. Furthermore, the departure timing of the electromagnet changes if the electromagnet generates heat regardless of power voltage control.

Furthermore, the electromagnetically-driven shutter discussed in Japanese Patent Application Laid-Open No. 58-149027 can stabilize the accuracy in exposure control based on a voltage correction, considering heat generation in the coil, by detecting the temperature of the shutter blade driving coil.

However, the above-described electromagnetically-driven shutter requires a dedicated temperature detector and a circuit that can correct the control voltage. Accordingly, the cost increases. Furthermore, the time available for switching the voltage is short and insufficient if the shutter operates in a high-speed shooting operation. Thus, actual application of the technique discussed in Japanese Patent Application Laid-Open No. 58-149027 is substantially limited to a low-speed shooting operation.

SUMMARY OF THE INVENTION

Exemplary embodiments of the present invention are directed to an imaging apparatus that includes a mechanical shutter to perform a shooting operation and of which is capable of stabilizing exposure accuracy.

According to a first aspect of the present invention, an imaging apparatus includes an image sensor configured to capture an image of an object; a mechanical shutter including a second curtain and a second-curtain holding mechanism configured to electromagnetically hold the second curtain at an initial position prior to a travel; a first temperature sensor disposed within a predetermined range from the second-curtain holding mechanism and configured to measure temperature; a second temperature sensor disposed outside the predetermined range from the second-curtain holding mechanism and configured to measure temperature; a determination unit configured to determine an exposure time for the image sensor according to a brightness of the object; an adjustment unit configured to adjust the exposure time determined by the determination unit if a temperature difference between temperatures detected by the first temperature sensor and the second temperature sensor is greater than a predetermined threshold; and an exposure control unit configured to perform exposure control for the image sensor based on the exposure time adjusted by the adjustment unit if the temperature difference is greater than the predetermined threshold.

According to a second aspect of the present invention, an imaging apparatus includes an image sensor configured to capture an image of an object to generate an electric signal; a mechanical shutter including a second curtain and a second-curtain holding mechanism configured to electromagnetically hold the second curtain at an initial position prior to a travel; a first temperature sensor disposed within a predetermined range from the second-curtain holding mechanism and configured to measure temperature; a second temperature sensor disposed outside the predetermined range from the second-curtain holding mechanism and configured to measure temperature; an image processing circuit configured to perform a gain correction using a predetermined gain value for the electric signal generated by the image sensor; and an adjustment unit configured to adjust the gain value used in the image processing circuit according to a temperature difference between temperatures detected by the first temperature sensor and the second temperature sensor if the temperature difference is greater than a predetermined threshold.

According to a third aspect of the present invention, a method is provided for controlling an imaging apparatus including an image sensor configured to capture an image of an object, a mechanical shutter including a second curtain and a second-curtain holding mechanism configured to electromagnetically hold the second curtain at an initial position prior to a travel, a first temperature sensor disposed within a predetermined range from the second-curtain holding mechanism and configured to measure temperature, and a second temperature sensor disposed outside the predetermined range from the second-curtain holding mechanism and configured to measure temperature. The method includes determining an exposure time for the image sensor according to a brightness of the object; adjusting the determined exposure time if a temperature difference between temperatures detected by the first temperature sensor and the second temperature sensor is greater than a predetermined threshold; and performing exposure control for the image sensor based on the adjusted exposure time if the temperature difference is greater than the predetermined threshold.

Furthermore, according to a fourth aspect of the present invention, a method is provided for controlling an imaging apparatus including an image sensor configured to capture an image of an object to generate an electric signal, a mechanical shutter including a second curtain and a second-curtain holding mechanism configured to electromagnetically hold the second curtain at an initial position prior to a travel, a first temperature sensor disposed within a predetermined range from the second-curtain holding mechanism and configured to measure temperature, and a second temperature sensor disposed outside the predetermined range from the second-curtain holding mechanism and configured to measure temperature. The method includes performing a gain correction using a predetermined gain value for the electric signal generated by the image sensor, and adjusting the gain value to be used for gain correction according to a temperature difference between temperatures detected by the first temperature sensor and the second temperature sensor if the temperature difference is greater than a predetermined threshold.

Still yet, according to a fifth aspect of the present invention, an imaging apparatus includes an image sensor configured to capture an image of an object; a mechanical shutter including a second curtain and a second-curtain holding mechanism configured to electromagnetically hold the second curtain at an initial position prior to a travel; a determination unit configured to determine an exposure time for the image sensor according to a brightness of the object; a time measurement unit configured to measure an energization time for energizing the second-curtain holding mechanism and an elapsed time between stoppage of energization to the second-curtain holding mechanism and restart of energization to the second-curtain holding mechanism; an exposure time adjustment unit configured to adjust the exposure time determined by the determination unit if a difference value between the energization time and the elapsed time is greater than a predetermined threshold; and an exposure control unit configured to perform exposure control for the image sensor based on the exposure time determined by the determination unit if the difference value is not greater than the predetermined threshold, and based on the exposure time adjusted by the exposure time adjustment unit if the difference value is greater than the predetermined threshold.

Moreover, according to a sixth aspect of the present invention, an imaging apparatus includes an image sensor configured to capture an image of an object to generate an electric signal; a mechanical shutter including a second curtain and a second-curtain holding mechanism configured to electromagnetically hold the second curtain at an initial position prior to a travel; a determination unit configured to determine an exposure time for the image sensor according to a brightness of the object; an image processing circuit configured to perform gain correction using a predetermined gain value for the electric signal generated by the image sensor; a time measurement unit configured to measure an energization time for energizing the second-curtain holding mechanism and an elapsed time between stoppage of energization to the second-curtain holding mechanism and restart of energization to the second-curtain holding mechanism; and a gain adjustment unit configured to adjust the gain value used in the image processing circuit according to a difference value between the energization time and the elapsed time if the difference value is greater than a predetermined threshold.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

DETAILED DESCRIPTION OF THE EMBODIMENTS

Figure 1:
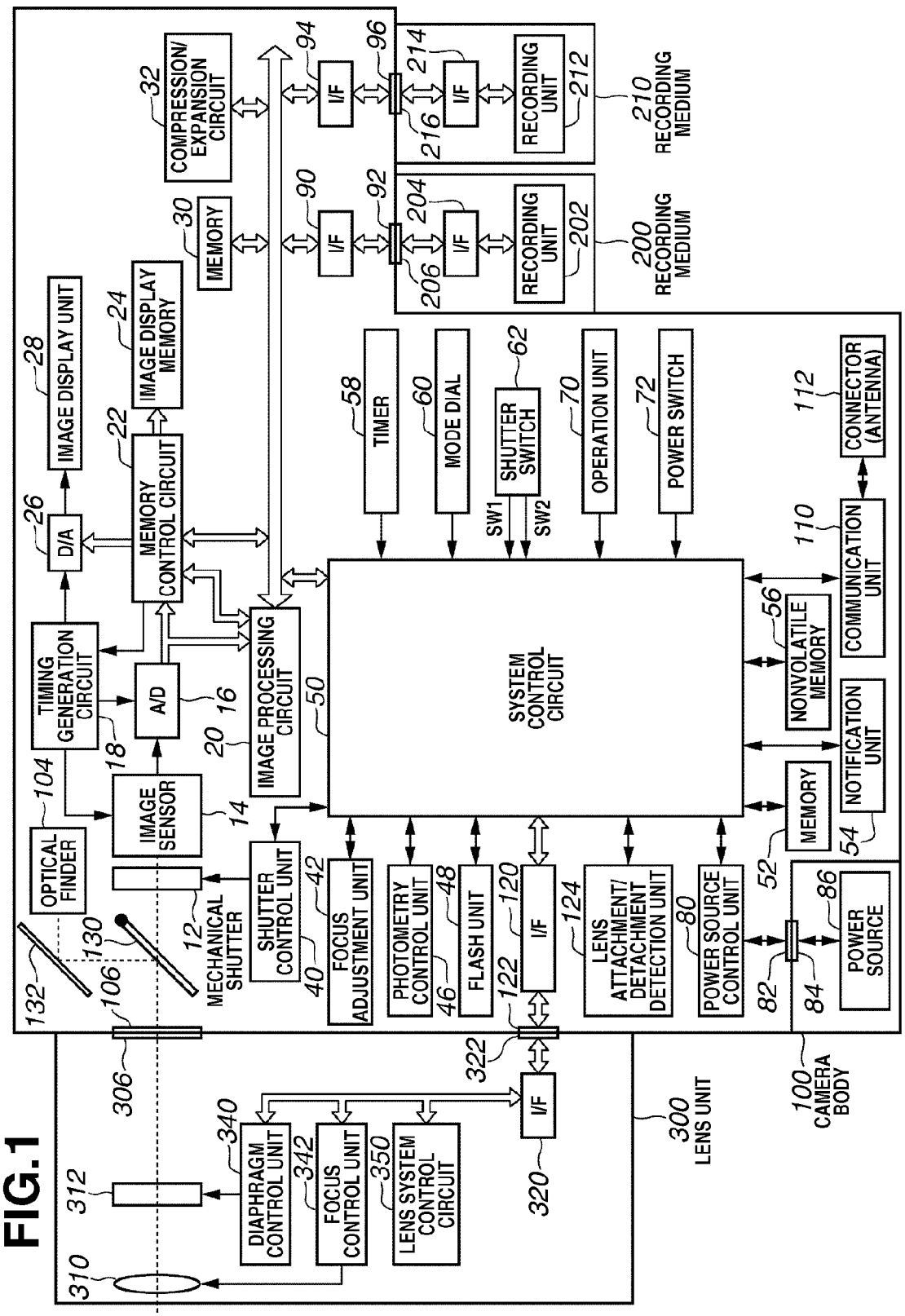
FIG. 1 is a block diagram illustrating an example of a configuration of an imaging apparatus according to an exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Exemplary embodiments will be described in detail below with reference to the drawings.

First Exemplary Embodiment

Constituent components described in an exemplary embodiment have dimensions, shapes, and mutual positional relationships, which can be appropriately modified according to an apparatus to which the present invention is applied or according to other conditions. Therefore, the present invention is not limited to each example.

FIG. 1 is a block diagram illustrating an example imaging system according to an exemplary embodiment of the present invention, which includes a camera body 100 and a lens unit 300. The lens unit 300 is detachable from the camera body 100. The lens unit 300 is an interchangeable lens unit that includes a focal length changing mechanism and a focusing mechanism (not illustrated).

The lens unit 300 includes an optical lens 310, a diaphragm 312, and a lens mount 306. The lens mount 306 can engage with a camera mount 106 of the camera body 100. For example, both the lens mount 306 and the camera mount 106 are flange type. The lens unit 300 can be attached to the camera body 100 by mechanically engaging the lens mount 306 with the camera mount 106.

The lens unit 300 includes a lens signal contact 322, which is connectable with a camera signal contact 122 of the camera body 100 to provide an electric path (and/or a communication path) between the lens unit 300 and the camera body 100. When the lens signal contact 322 and the camera signal contact 122 are connected, the camera body 100 and the lens unit 300 can transmit/receive control signals, state signals, and data signals with each other or supply electric power for various voltage controls. In an exemplary embodiment, the camera body 100 and the lens unit 300 can perform optical communications, speech communications in addition to the electric communications via the lens signal contact 322 and the camera signal contact 122.

A diaphragm control unit 340 controls the diaphragm 312 based on photometric information supplied from a photometry control unit 46 while cooperating with a shutter control unit 40 that controls a shutter 12 of the camera body 100. A focus control unit 342 controls the focal length changing mechanism of the optical lens 310 for focus adjustment operation.

A lens system control circuit 350 performs overall control for the lens unit 300. The lens system control circuit 350 includes a memory that stores operation constants, parameters, and programs. Furthermore, the lens system control circuit 350 includes a nonvolatile memory that stores identification information (e.g., unique number allocated to the lens unit 300), management information, functional information (e.g., opened diaphragm value (full-aperture value), minimum aperture value, and focal length), and present or past setting values.

The diaphragm control unit 340, the focus control unit 342, and the lens system control circuit 350 can communicate with the camera body 100 via an interface (I/F) 320 and the lens signal contact 322. The camera body 100 includes a lens attachment/detachment detection unit 124 that can detect attachment/detachment of the lens unit 300.

The camera body 100 includes the lens mount 106, via which the camera body 100 can be mechanically united with the lens unit 300. The lens attachment/detachment detection unit 124 generates a detection signal in response to attachment/detachment of the lens unit 300. A system control circuit 50 receives the detection signal generated by the lens attachment/detachment detection unit 124. Two mirrors 130 and 132 guide incident light from the optical lens 310 to an optical finder 104 according to the single lens reflex mechanism.

The mirror 130 is a rotary quick return mirror, although it can be replaced with a half mirror. The quick return mirror 130, in a mirror down state (i.e., a state illustrated in FIG. 1), reflects light having passing through the optical lens 310 (i.e., incident light) upward. The mirror 132 guides the incident light toward the optical finder 104 that enables a user to confirm an object image. The mirror 132 can be replaced with a pentagonal prism.

When the quick return mirror 130 is in a mirror up state (not illustrated), the incident light is not reflected by the quick return mirror 130 and is guided toward an image sensor 14 via the mechanical shutter 12 controlled by the shutter control unit 40. In this manner, the quick return mirror 130 can switch the path of incident light. If the mirror 130 is a stationary-type half mirror, the mirror 130 can separate the incident light into a beam advancing toward the mirror 132 and a beam advancing toward the image sensor 14. According to an exemplary embodiment, the mechanical shutter 12 is a focal-plane shutter that includes a first curtain and a second curtain.

The image sensor 14 converts an optical image formed on its imaging surface into electric charge to generate an electric signal corresponding to the electric charge. The image sensor 14 can electronically configure a first curtain when it performs reset scanning to reset the converted electric charge. In the following description, the first curtain realized by the reset scanning is referred to as "electronic first-curtain." The first curtain and the second curtain of the mechanical shutter 12 are simply referred to as "first curtain" (or "mechanical first-curtain") and "second curtain" (or "mechanical second-curtain").

An analog-to-digital (A/D) converter 16 converts an analog signal generated by the image sensor 14 into a digital signal (hereinafter, referred to "image data"). A timing generation circuit 18 supplies a clock signal or a control signal to the image sensor 14, the A/D converter 16, and a digital-to-analog (D/A) converter 26. The memory control circuit 22 and the system control circuit 50 can control the timing generation circuit 18.

The A/D converter 16 converts an electric signal generated by the image sensor 14 into image data and outputs the image data to an image processing circuit 20 or the memory control circuit 22. The image processing circuit 20 performs predetermined image processing (e.g., gain correction, pixel interpolation processing, and color conversion processing) on image data supplied from the A/D converter 16 or image data supplied from the memory control circuit 22.

The memory control circuit 22 controls the A/D converter 16, the timing generation circuit 18, the image processing circuit 20, an image display memory 24, the D/A converter 26, a memory 30, and a compression/expansion circuit 32. Furthermore, the memory control circuit 22 performs processing for writing image data directly input from the A/D converter 16 into the memory 30 or the image display memory 24 and also performs processing for reading image data from the memory 30 or the image display memory 24.

An image display unit 28 is, for example, a thin film transistor (TFT) type liquid crystal display (LCD). The image display memory 24 stores image data, which can be displayed on the image display unit 28. The memory control circuit 22 reads image data from the image display memory 24 and sends the read image data via the D/A converter 26 to the image display unit 28, which displays an image based on the captured image data. The image display unit 28 can realize an electronic viewfinder (EVF) by sequentially displaying captured image data. Furthermore, the system control circuit 50 can perform turning on/off control for the image display unit 28. The image display unit 28, if in a turned-off state, displays no image on its screen and, therefore, electric power consumption for the camera body 100 can be reduced.

The memory 30 stores image data of captured images. The memory 30 has a storage capacity to store image data corresponding to a predetermined number of images. Furthermore, the memory 30 functions as work area for the system control circuit 50. The compression/expansion circuit 32 compresses or expands image data according to a compression method (e.g., adaptive discrete cosine transform (ADCT) technique). The compression/expansion circuit 32 performs compression processing or expansion processing on image data read from the memory 30 and writes the processed data into the memory 30.

The system control circuit 50, including a central processing unit (CPU), performs overall control for the camera body 100. The system control circuit 50 refers to program(s), constants, and parameter data stored in a memory 52 for the control of the camera body 100.

An example control operation performed by the system control circuit 50 is generation of a control signal to be used in the processing (e.g., through the lens (TTL) auto-focus (AF) processing, auto-exposure (AE) processing, and flash pre-emission (EF) processing). Each control signal generated by the system control circuit 50 is supplied to the shutter control unit 40, a focus adjustment unit 42, the photometry control unit 46, and a flash unit 48.

The focus adjustment unit 42 generates a signal to focus an object image based on a control signal supplied from the system control circuit 50. The signal generated by the focus adjustment unit 42 is sent to the focus control unit 342 via the system control circuit 50, an interface (I/F) 120, the signal contacts 122 and 322, and the interface (I/F) 320. The focus control unit 342 drives a focusing mechanism for the optical lens 310 so that the optical lens 310 is kept in an in-focus state.

The photometry control unit 46 measures the intensity of incident light (i.e., brightness of an object to be imaged). The system control circuit 50 determines an exposure time and an aperture value based on a photometric value measured by the photometry control unit 46. The system control circuit 50 transmits a control signal to the shutter control unit 40 and a control signal to the diaphragm control unit 340. In this manner, the system control circuit 50 functions as a determination unit.

The shutter control unit 40 adjusts an exposure time for the mechanical shutter 12 based on a control signal from the system control circuit 50. The diaphragm control unit 340 controls the diaphragm 312 based on a control signal from the system control circuit 50. Thus, the shutter control unit 40 and the diaphragm control unit 340 cooperatively control an exposure amount.

Furthermore, if an electronic shutter is employed for the exposure amount control, the system control circuit 50 controls the timing generation circuit 18 to cause the image sensor 14 to perform a reset scanning operation. Namely, the system control circuit 50, the shutter control unit 40, and the timing generation circuit 18 constitute an exposure control unit.

The flash unit 48 has an AF auxiliary light projection function and a flash control function. The flash unit 48 emits flash light having a quantity of light corresponding to a control signal supplied from the system control circuit 50.

Furthermore, the system control circuit 50 controls a notification unit 54, which notifies a user of setting information (e.g., shooting mode, operation state) or a message using text, image, or sound. The notification unit 54 can be constituted by a liquid crystal display (LCD) unit, a sound-generating element, or a light-emitting diode (LED), or by a combination of them. Furthermore, the notification unit 54 is partly incorporated in the optical finder 104.

The content displayed on the LCD via the notification unit 54 includes shooting mode-related display (single shooting/continuous shooting display, self timer display, etc.), recording-related display (compression rate display, recording pixel number display, number of recorded-images display, number of recordable-images display, etc.), and shooting condition-related display (shutter speed display, aperture value display, exposure compensation display, flash display, red-eye reduction display, etc.).

Furthermore, the content displayed on the LCD includes miscellaneous display (macro shooting display, buzzer setting display, remaining capacity display for the timer battery, remaining battery capacity display, error display, plural digit information display, attachment/detachment state display for the recording media 200 and 210, attachment/detachment state display for the lens unit 300, communication I/F operation display, date/time display, connection state display for an external computer, etc).

The display contents that the notification unit 54 can display via the optical finder 104 include, for example, in-focus display, shooting preparation completion display, camera-shake warning display, flash unit charge display, flash charge completion display, shutter speed display, aperture value display, exposure compensation display, and recording medium writing operation display.

The display contents that the notification unit 54 can display via LEDs include, for example, in-focus display, shooting preparation completion display, camera-shake warning display, flash unit charge display, flash charge completion display, recording medium writing operation display, macro shooting setting notification display, and secondary battery charge display.

The display contents that the notification unit 54 can display via a lamp include, for example, self-timer notification lamp, which can be used as AF auxiliary light.

Furthermore, the system control circuit 50 controls transmitting or receiving image data to or from an external apparatus via a communication unit 110. The communication unit 110 has a communication function using RS232C, USB, IEEE1394, SCSI, LAN, modem, or wireless communication. The communication unit 110 includes a connector (or an antenna for wireless communication) 112 to which an external apparatus can be connected.

A timer 58 (time measurement unit) is used to control the shutter control unit 40 to determine an exposure time according to the shutter time of seconds set by the operation unit 70. Furthermore, the timer 58 counts an energization time (i.e., a time interval from start to stoppage of energization to the second curtain coil of the mechanical shutter 12) and an elapsed time (i.e., a time interval from stoppage to restart (SW2 ON) of energization to the second curtain coil) for the shutter control unit 40.

Furthermore, the time counted by the timer 58 can be temporarily stored in a nonvolatile memory 56 (e.g., EEPROM). A user can enter an operation instruction to the system control circuit 50 via a mode dial 60, a shutter switch 62, an operation unit 70, or a power switch 72.

The mode dial 60 enables a user to select or set a functional shooting mode (e.g., automatic shooting mode, programmed shooting mode, shutter speed priority shooting mode, aperture priority shooting mode, manual shooting mode, depth-of-focus priority shooting mode, portrait shooting mode, landscape shooting mode, close-up shooting mode, sports shooting mode, night view shooting mode, and panoramic shooting mode).

The shutter switch 62 is a two-stage switch including a switch SW1 and a switch SW2. If a user presses the shutter switch 62 by a predetermined amount (e.g. in a half-pressed state), the switch SW1 is turned on. If the user further presses the shutter switch 62 (e.g., in a fully-pressed state), the switch SW2 is turned on.

In response to a turned-on action of the switch SW1, the system control circuit 50 outputs a start signal instructing AF processing, AE processing, and EF processing. Furthermore, in response to a turned-on action of the switch SW2, the system control circuit 50 outputs a start signal instructing a series of shooting operations including exposure processing, development processing, and recording processing, so that image data (i.e., signal read from the image sensor 14) can be written into the recording medium 200 or 210.

First, in the exposure processing, the system control circuit 50 rotates the quick return mirror 130 upward, drives the mechanical shutter 12, and causes the A/D converter 16 and the memory control circuit 22 to read a photoelectrically converted signal from the image sensor 14 and write the read signal as image data into the memory 30.

In the development processing, the system control circuit 50 causes the image processing circuit 20 and the memory control circuit 22 to perform computation-based development processing and writes the processed image data into the memory 30. Furthermore, in the recording processing, the system control circuit 50 causes the compression/expansion circuit 32 to compress image data read out of the memory 30 and writes the compressed image data into the recording medium 200 or 210.

The operation unit 70 includes various buttons and dials, such as a menu button, a set button, a playback button, a delete button, a jump button, an exposure compensation button, a single shooting/continuous shooting mode switching button, a photometric mode switching button, an AF mode switching button, a white balance (WB) mode switching button, an ISO sensitivity setting button, a main electronic dial, a sub electronic dial, a live view mode button (i.e., a button for on/off controlling the EVF). For example, if a user presses the menu button, the system control circuit 50 causes the notification unit 54 or the image display unit 28 to display a setting screen that enables a user to select setting item(s) on the setting screen.

Furthermore, the setting screen according to an exemplary embodiment enables a user to select and set an ordinary shooting mode, an electronic first-curtain shooting mode, or a mechanical first-curtain/mechanical second-curtain mode. The parameters and modes set by a user via the mode dial 60 or the operation unit 70 are stored in the nonvolatile memory 56 (e.g., EEPROM).

Furthermore, the operation unit 70 includes a standard setting state setting unit that enables a user to set a desired setting state (including shooting mode, exposure compensation value, single shooting/continuous shooting mode, photometric mode, AF mode, WB mode, and ISO sensitivity) as standard setting state. The standard setting state data is stored in the nonvolatile memory 56.

A power switch 72 enables a user to select or set a power-on mode or a power-off mode for the camera body 100. Furthermore, the power switch 72 can select or set a power-on mode or a power-off mode for the lens unit 300 connected to the camera body 100, an external flash unit, recording media 200 and 210, and other various accessories.

A power source control unit 80 supplies electric power to the system control circuit 50. The power source control unit 80 controls electric power supplied to each unit from a power source 86 based on an instruction supplied from the system control circuit 50. The power source control unit 80 and the power source 86 are connected with each other via the contacts 82 and 84. The power source 86 is, for example, a primary battery (e.g., alkali battery), a secondary battery (e.g., lithium ion battery or nickel-metal hydride battery), or an AC adapter.

The image data (compressed image data) stored in the memory 30 can be written into a recording medium 200 connected via an interfaces (I/F) 90 and a connector 92 or a recording medium 210 connected via an interfaces 94 and a connector 96. The recording media 200 and 210 are, for example, a memory card or a hard disk. The recording medium 200 includes a recording unit 202 constituted by a semiconductor memory or a magnetic disk, an interface 204 for communication with the camera body 100, and a connector 206. The recording medium 210 includes a recording unit 212 constituted by a semiconductor memory or a magnetic disk, an interface 214 for communication with the camera body 100, and a connector 216.

In an exemplary embodiment, the camera body 100 is connectable with two recording media 200 and 210. However, according to another exemplary embodiment, the camera body 100 is connectable with one recording medium or three recording media. In an exemplary embodiment, an imaging apparatus is an interchangeable type, such as a single lens reflex type digital camera. However, the imaging apparatus according to an exemplary embodiment can be a camera including a lens and a lens barrel integrated with a body.

[Exemplary Configuration of Mechanical Shutter]

Figure 2:
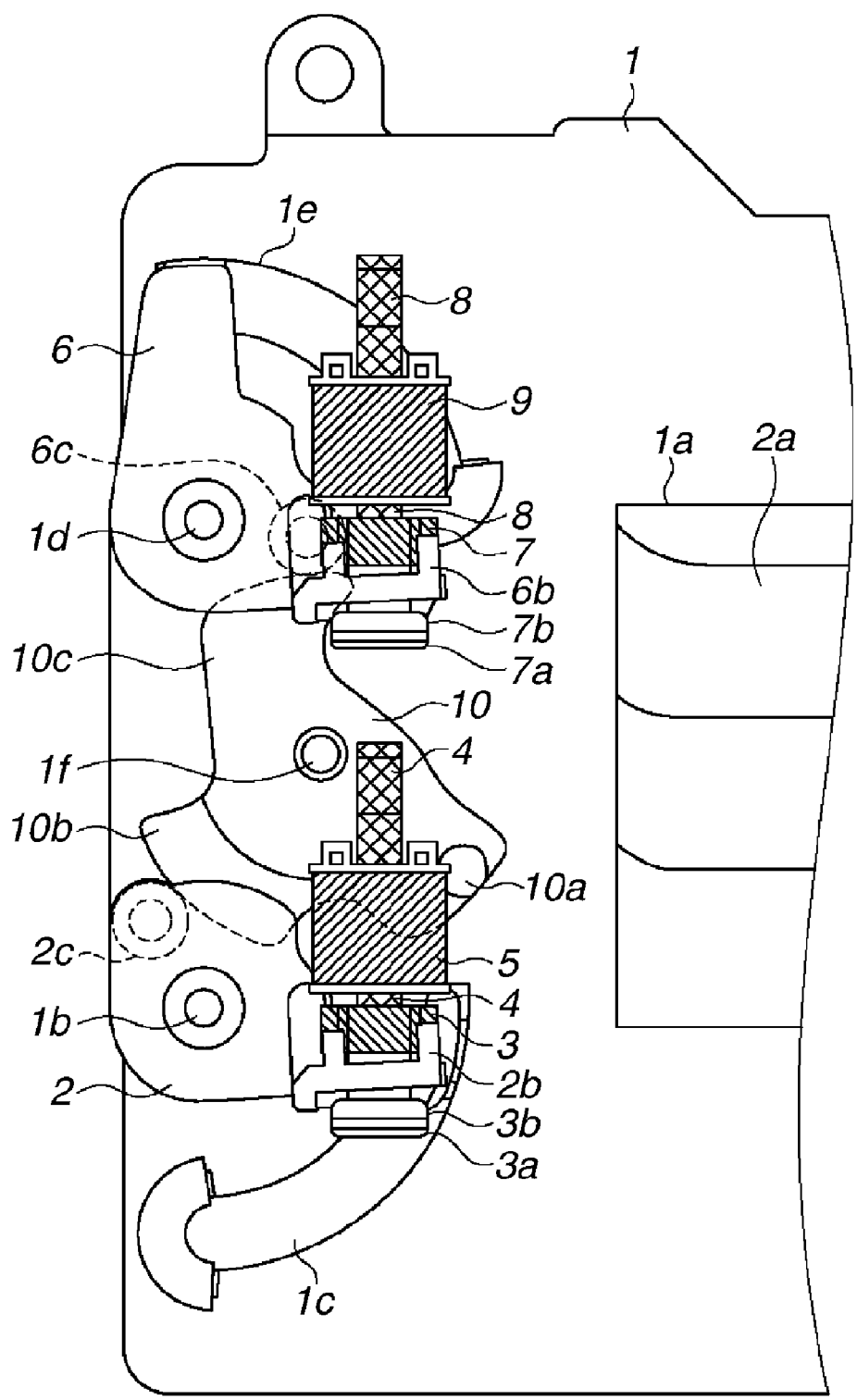
FIG. 2 is a plan view illustrating a charge completion state of a focal-plane shutter according to an exemplary embodiment of the present invention.
Figure 3:
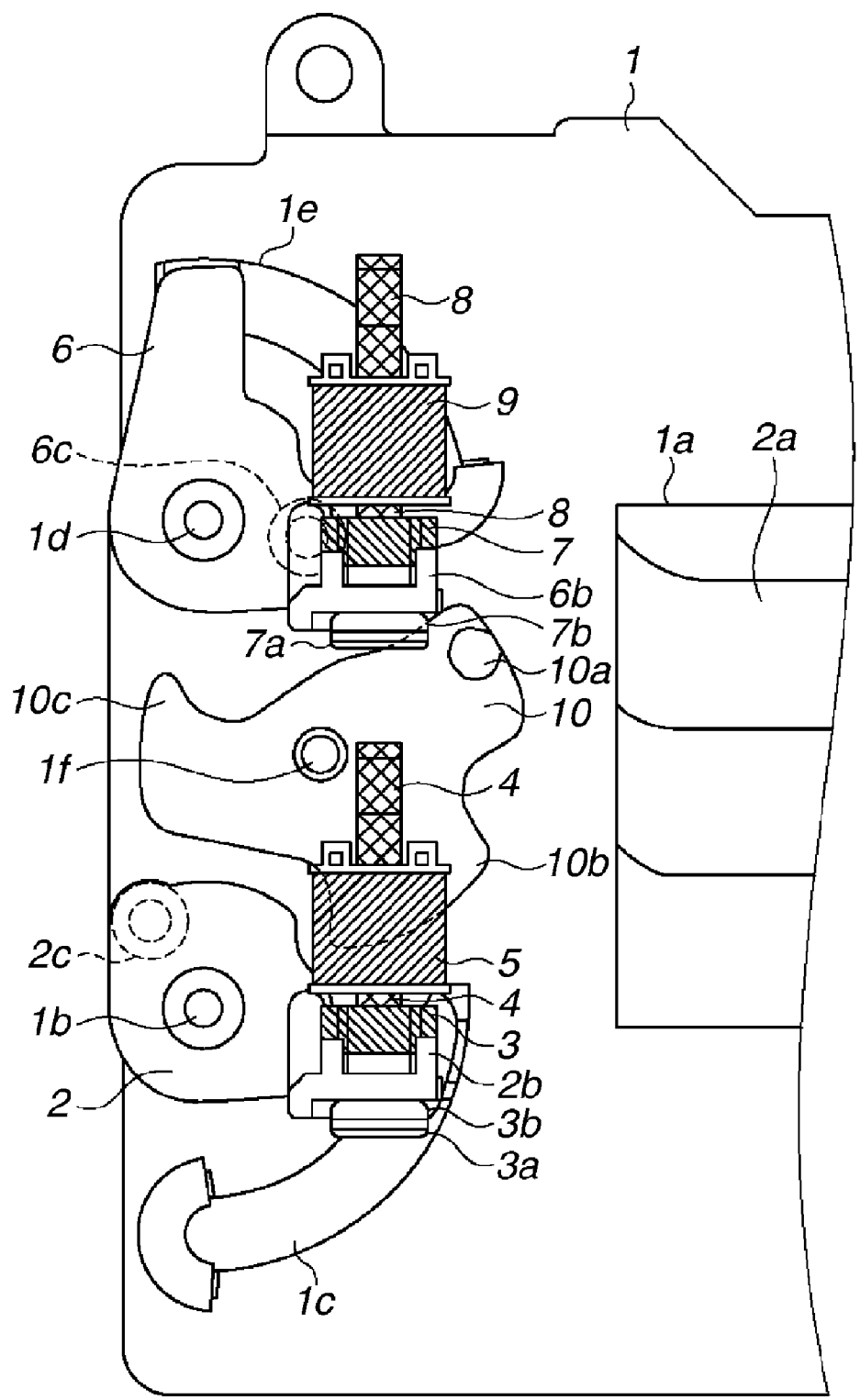
FIG. 3 is a plan view illustrating a pre-travel standby state of the focal-plane shutter according to an exemplary embodiment of the present invention.
Figure 4:
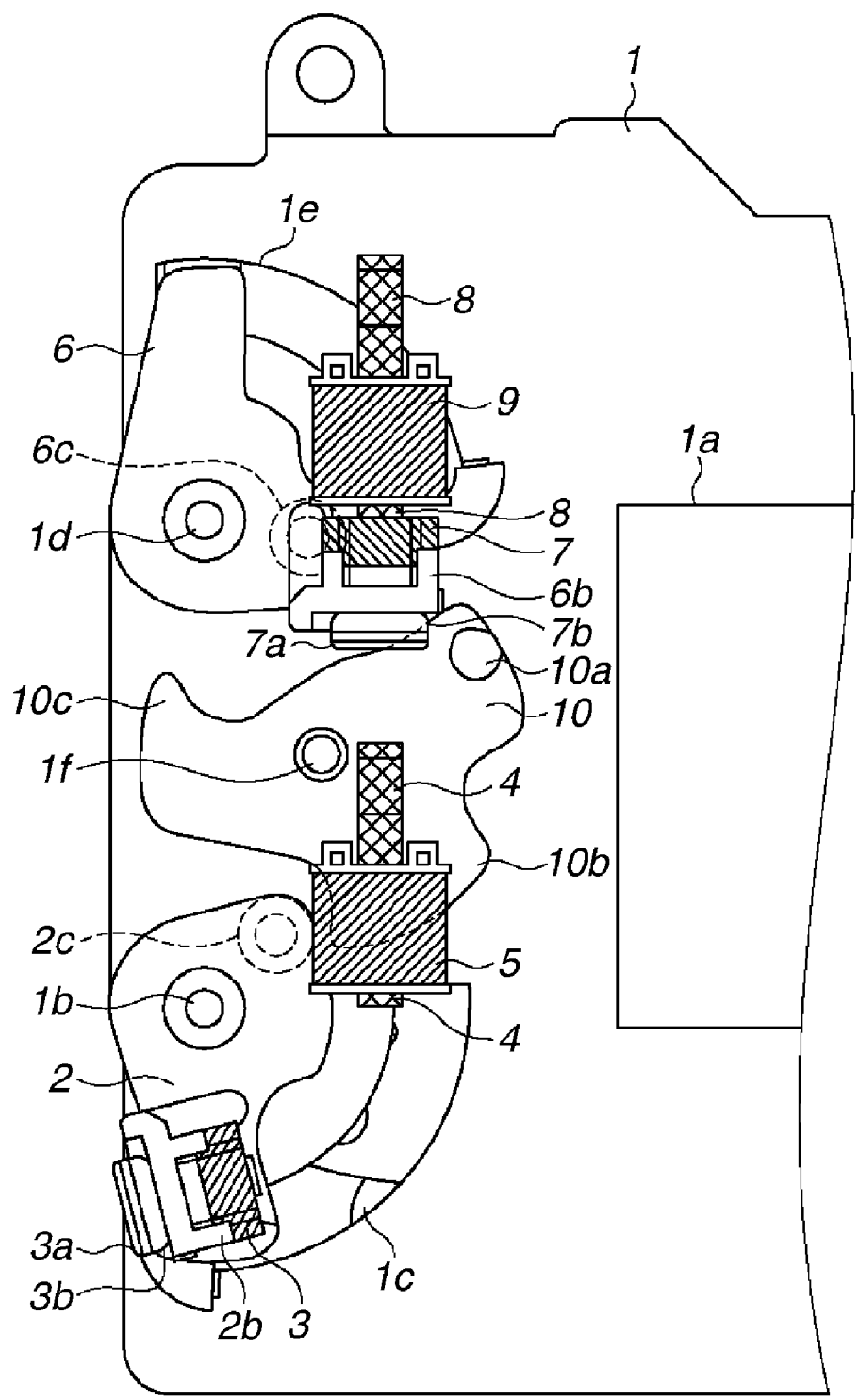
FIG. 4 is a plan view illustrating a first-curtain travel completion state of the focal-plane shutter according to an exemplary embodiment of the present invention.
Figure 5:
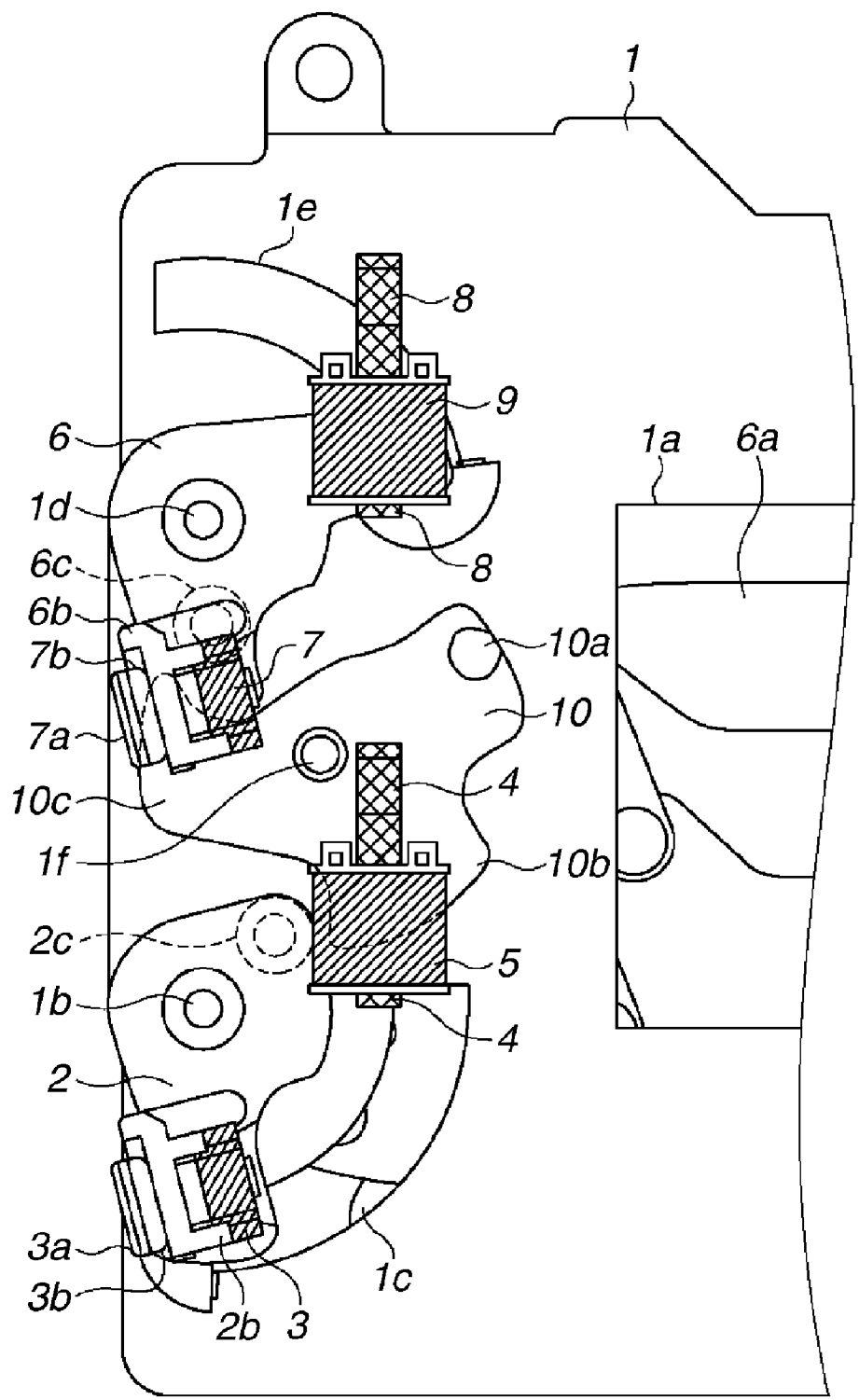
FIG. 5 is a plan view illustrating a second-curtain travel completion state of the focal-plane shutter according to an exemplary embodiment of the present invention.

An example configuration of the mechanical shutter 12 is described below with reference to FIGS. 2 through 6. FIGS. 2 through 6 are plan views illustrating the left half of the mechanical shutter 12 as viewed from an object side in a state where the mechanical shutter 12 is incorporated in the camera body 100. FIG. 2 illustrates an overcharge state where the first curtain and the second curtain are charged by a later-described charge lever. FIG. 3 illustrates a pre-travel standby state where the first curtain and the second curtain are held at initial positions by a later-described yoke and a coil that generate an electromagnetic force. FIG. 4 illustrates a first-curtain travel completion state. FIG. 5 illustrates a second-curtain travel completion state.

In FIGS. 2 through 5, constituent components of a driving mechanism for a first-curtain blade group 2a and a second-curtain blade group 6a (FIG. 5) are provided on a shutter base plate 1. An aperture 1a, which allows the light flux of an object to pass therethrough, is formed on the shutter base plate 1.

A first-curtain driving lever (driving member) 2 can rotate around a first-curtain shaft 1b provided on a surface of the shutter base plate 1. A torsion coil spring (not illustrated) is positioned along the outer periphery of the first-curtain shaft 1b. In FIG. 2, the torsion coil spring resiliently urges the first-curtain driving lever 2 in the clockwise direction so that the first-curtain blade group 2a can travel in this direction.

The first-curtain driving lever 2 includes a first-curtain driving pin (not illustrated) formed on its front end portion. The first-curtain driving pin, extending across a first curtain groove 1c formed on the shutter base plate 1, engages with a first-curtain driving arm (not illustrated). The first-curtain driving arm is connected to the first-curtain blade group 2a via a link mechanism. The first-curtain blade group 2a includes a plurality of shutter blades.

When the first-curtain driving lever 2 rotates, the first-curtain driving pin moves along the first curtain groove 1c and the first-curtain driving arm rotates to cause the first-curtain blade group 2a to stretch or retract. The first curtain groove 1c restricts a rotational range of the first-curtain driving lever 2.

Furthermore, a first-curtain armature supporting portion 2b is provided on the first-curtain driving lever 2. A through-hole portion (not illustrated) formed on the first-curtain armature supporting portion 2b has a flange portion larger than an inner diameter of the through-hole portion. A first-curtain armature shaft 3a integrally attached to a first curtain armature 3 engages with the flange portion of the through-hole portion. The first-curtain armature shaft 3a extends in a direction perpendicular to an attraction surface of the first curtain armature 3.

A compression spring (not illustrated) is disposed along the outer periphery of the first-curtain armature shaft 3a between the first curtain armature 3 and the first-curtain armature supporting portion 2b. The compression spring resiliently urges the first curtain armature 3 in a direction departing from the armature supporting portion 2b (i.e., the up-and-down direction in FIG. 2).

A first-curtain shock absorbing rubber (shock absorbing member) 3b is an elastically deformable member located between the first-curtain armature supporting portion 2b and the first-curtain armature shaft 3a and is positioned on a surface perpendicular to the longitudinal direction of the first-curtain armature shaft 3a.

The first-curtain shock absorbing rubber 3b prevents the first-curtain armature supporting portion 2b from directly colliding with the first-curtain armature shaft 3a, when the first-curtain armature supporting portion 2b moves from an overcharge state to a travel starting state. Thus, by elastically deforming, the first-curtain shock absorbing rubber 3b absorbs a shock applied from the first-curtain armature supporting portion 2b to the first-curtain armature shaft 3a.

A first curtain coil (electromagnetic member) 5 is provided along the outer periphery of a first curtain yoke (electromagnetic member) 4. When a voltage is applied to the first curtain coil 5, the first curtain yoke 4 generates a magnetic force, which can magnetically attract the first curtain armature 3. Thus, after the charge lever 10 rotates in the counterclockwise direction from the overcharge state illustrated in FIG. 2, the first-curtain blade group 2a is held at an initial position (i.e., a pre-travel standby state illustrated in FIG. 3) where the first-curtain blade group 2a can close the aperture 1a. As described above, the first curtain armature 3, the first curtain yoke 4, and the first curtain coil 5 constitute a first-curtain holding mechanism that can hold the first-curtain blade group 2a (first curtain) at an initial position.

A second-curtain driving lever (driving member) 6 can rotate around a second curtain shaft 1d provided on the surface of the shutter base plate 1. A torsion coil spring (not illustrated), positioned along the outer periphery of the second curtain shaft 1d, resiliently urges the second-curtain driving lever 6 in the clockwise direction (i.e., a traveling direction of the second curtain blade group) in FIG. 2.

The second-curtain driving lever 6 includes a second-curtain driving pin (not illustrated) formed on its front end portion. The second-curtain driving pin extends across a second curtain groove 1e formed on the shutter base plate 1 and engages with a second-curtain driving arm (not illustrated). The second-curtain driving arm is connected to the second-curtain blade group 6a (retracted state in FIGS. 2 to 4) via a link mechanism. The second-curtain blade group 6a includes a plurality of shutter blades.

When the second-curtain driving lever 6 rotates, the second-curtain driving pin moves along the second curtain groove 1e and the second-curtain driving arm rotates to cause the second-curtain blade group 6a to stretch or retract. The above-described operation of the first-curtain blade group 2a and the operation of the second-curtain blade group 6a can hold the aperture 1a in an opened state (where the light flux of an object can enter the aperture 1a) or in a closed state (where the light flux of an object cannot enter the aperture 1a). The second curtain groove 1e restricts a rotational range of the second-curtain driving lever 6.

Furthermore, a second-curtain armature supporting portion 6b is provided on the second-curtain driving lever 6. A through-hole portion (not illustrated) formed on the second-curtain armature supporting portion 6b has a flange portion larger than an inner diameter of the through-hole portion. A second-curtain armature shaft 7a integrally attached to a second curtain armature 7 engages with the flange portion of the through-hole portion. The second-curtain armature shaft 7a extends in a direction perpendicular to an attraction surface of the second curtain armature 7.

A compression spring (not illustrated) is disposed along the outer periphery of the second-curtain armature shaft 7a between the second curtain armature 7 and the second-curtain armature supporting portion 6b. The compression spring resiliently urges the second curtain armature 7 in a direction departing from the second-curtain armature supporting portion 6b (i.e., the up-and-down direction in FIG. 2).

A second-curtain shock absorbing rubber 7b is an elastically deformable member located between the second-curtain armature supporting portion 6b and the second-curtain armature shaft 7a and is positioned on a surface perpendicular to the longitudinal direction of the second-curtain armature shaft 7a. The second-curtain shock absorbing rubber 7b prevents the second-curtain armature supporting portion 6b from directly colliding with the second-curtain armature shaft 7a, when the second-curtain armature supporting portion 6b moves from an overcharge state to a travel starting state. Thus, by elastically deforming, the second-curtain shock absorbing rubber 7b absorbs a shock applied from the second-curtain armature supporting portion 6b to the second-curtain armature shaft 7a.

A second curtain coil (electromagnetic member) 9 is provided along the outer periphery of a second curtain yoke (electromagnetic member) 8. When a voltage is applied to the second curtain coil 9, the second curtain yoke 8 generates a magnetic force, which can magnetically attract the second curtain armature 7. Thus, after the charge lever 10 rotates in the counterclockwise direction from the overcharge state illustrated in FIG. 2, the second-curtain blade group 6a is held at an initial position (i.e., a pre-travel standby state illustrated in FIG. 3) where the second-curtain blade group 6a can open the aperture 1a. As described above, the second curtain armature 7, the second curtain yoke 8, and the second curtain coil 9 constitute a second-curtain holding mechanism that can hold the second-curtain blade group 6a (second curtain) at an initial position.

The charge lever 10 can rotate around a charge lever shaft 1f provided on the shutter base plate 1. The charge lever 10 is connected to a driving lever member (not illustrated) via a charge pin 10a. A driving source generates a driving force for rotating the driving lever member.

A cam portion 10b formed on the charge lever 10 contacts a first-curtain charge roller 2c provided on the first-curtain driving lever 2, and causes the first-curtain driving lever 2 to rotate according to a rotation of the charge lever 10. More specifically, when the first-curtain blade group 2a is in a travel completion state (i.e., when the first-curtain blade group 2a is in a retracted state) illustrated in FIG. 4, the cam portion 10b of the charge lever 10 causes the first-curtain driving lever 2 to rotate in the counterclockwise direction. Thus, the first-curtain driving lever 2 moves into the overcharge state illustrated in FIG. 2 via the pre-travel standby state illustrated in FIG. 3.

A cam portion 10c formed on the charge lever 10 contacts a second-curtain charge roller 6c provided on the second-curtain driving lever 6, and causes the second-curtain driving lever 6 to rotate according to a rotation of the charge lever 10. More specifically, when the second-curtain blade group 6a is in a travel completion state (i.e., when the second-curtain blade group 6a is in an extended state) illustrated in FIG. 5, the cam portion 10c of the charge lever 10 causes the second-curtain driving lever 6 to rotate in the counterclockwise direction. Thus, the second-curtain driving lever 6 moves into the overcharge state illustrated in FIG. 2 via the pre-travel standby state illustrated in FIG. 3.

Figure 6:
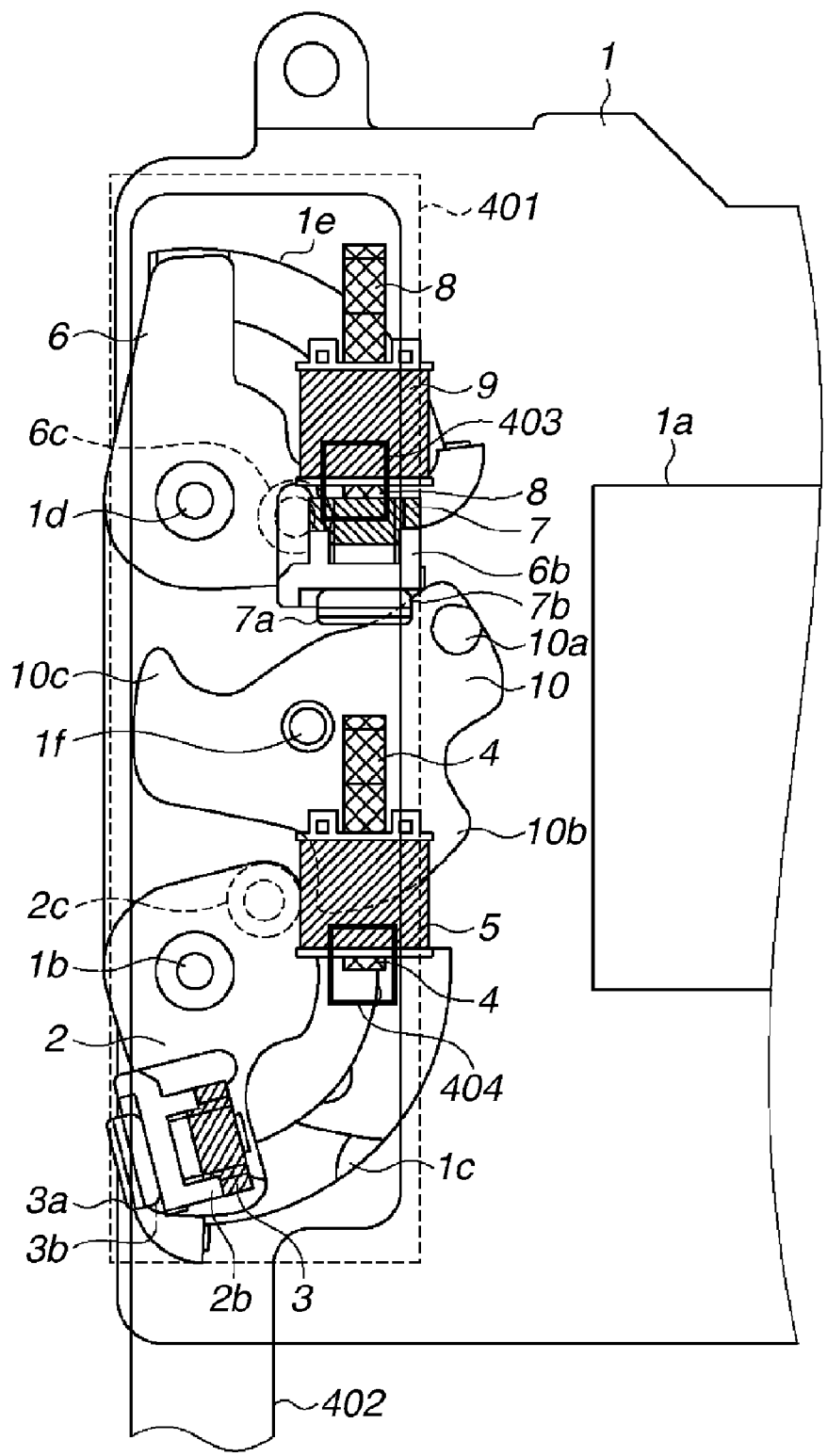
FIG. 6 is a plan view illustrating a mounting state of the focal-plane shutter according to a first exemplary embodiment of the present invention.

FIG. 6 illustrates a mounting state of the mechanical shutter 12. The first curtain yoke 4, the first curtain coil 5, the second curtain yoke 8, and the second curtain coil 9 are fixed on a magnet base plate 401. The magnet base plate 401 is in a predetermined positional relationship with the shutter base plate 1 and fixed by means of fastening or engaging members or an adhesive. The shutter control unit 40 is mounted on a flexible printed circuit board 402. A first-curtain temperature sensor 403 (second temperature sensor) and a second-curtain temperature sensor 404 (first temperature sensor) are mounted on the flexible printed circuit board 402.

The first-curtain temperature sensor 403 is positioned in the vicinity of the first curtain yoke 4 and an attraction portion of the first curtain armature 3. The second-curtain temperature sensor 404 is positioned in the vicinity of the second curtain yoke 8 and an attraction portion of the second curtain armature 7. However, according to another exemplary embodiment, the first-curtain temperature sensor 403 can be disposed in the vicinity of the optical finder 104 or at any other position that is distant from the second curtain yoke 8 and the attraction portion of the second curtain armature 7.

Namely, the second-curtain temperature sensor 404 (the first temperature sensor) is configured to measure the temperature of the second-curtain holding mechanism and is disposed within a predetermined range involving the second-curtain holding mechanism. The first-curtain temperature sensor 403 (the second temperature sensor) is disposed outside the predetermined range involving the second-curtain holding mechanism. The first-curtain temperature sensor 403 and the second-curtain temperature sensor 404 obtain a temperature difference between the second-curtain holding mechanism and a referential portion. For example, the first-curtain temperature sensor 403 can be disposed within a predetermined range involving the first-curtain holding mechanism.

In the electronic first-curtain adjustment performed during a camera assembling process, an output value of the first-curtain temperature sensor 403 is stored in the nonvolatile memory 56.

Furthermore, the flexible printed circuit board 402 is connected to the system control circuit 50 and can receive a control signal from the system control circuit 50 to start or stop energizing a coil. The flexible printed circuit board 402 can be replaced with a hard circuit board.

The above-described imaging system performs the following shutter control during a shooting operation according to an exemplary embodiment.

As described above, the setting screen displayed on the notification unit 54 or the image display unit 28 enables a user to select the ordinary shooting mode, the electronic first-curtain shooting mode, or the mechanical first-curtain/mechanical second-curtain mode. In the ordinary shooting mode, the first curtain and the second curtain of the mechanical shutter 12 control the exposure time while a user views an object through the optical finder 104.

In the electronic first-curtain shooting mode, the electronic first-curtain and the mechanical second-curtain control the exposure time while a user views an object through the EVF (live view mode). In the mechanical first-curtain/mechanical second-curtain mode, the first curtain and the second curtain of the mechanical shutter 12 control the exposure time while a user views an object through the EVF (live view mode).

[Example Operation in Ordinary Mode]

Figure 7:
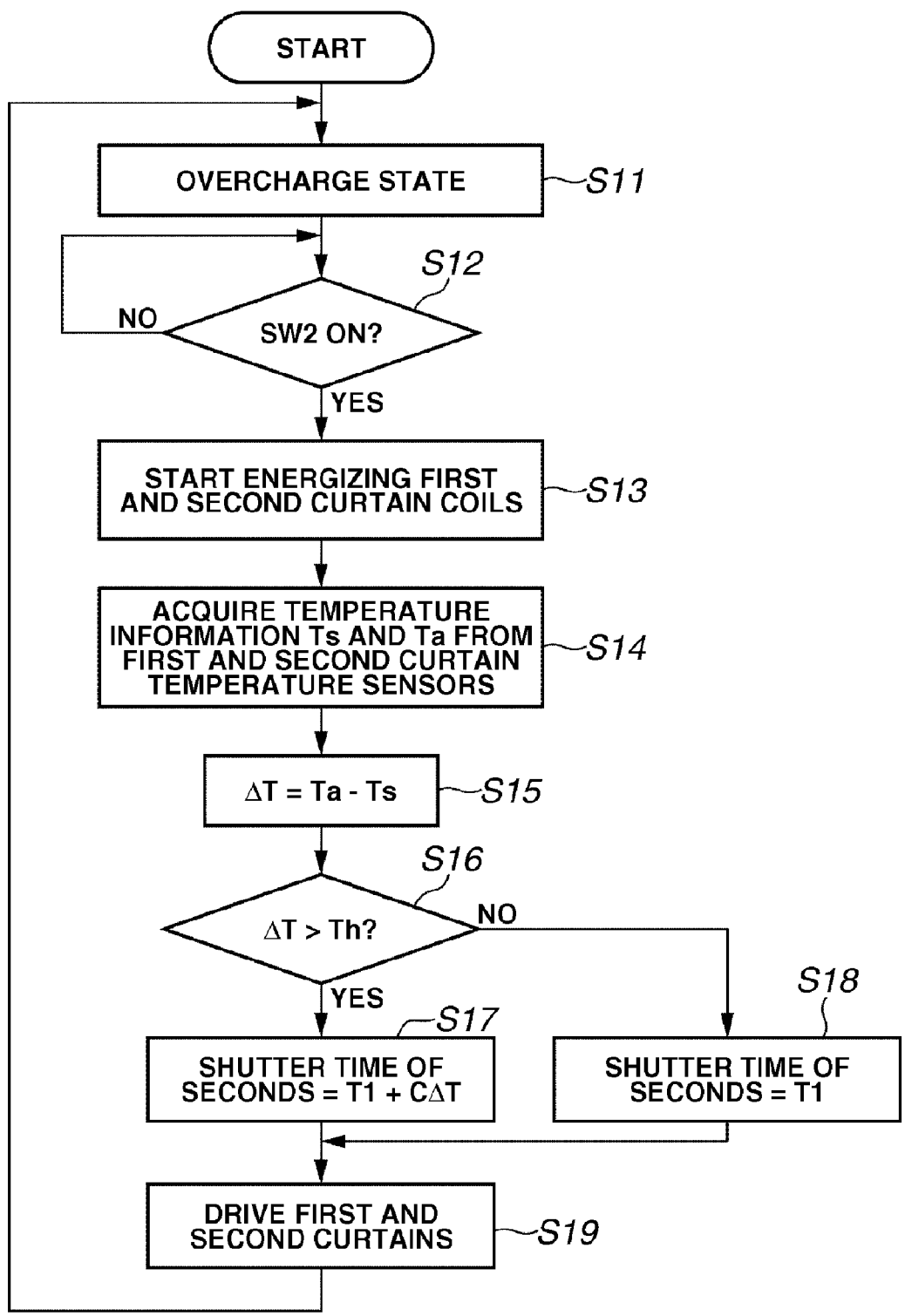
FIG. 7 is a flowchart illustrating an example shutter control operation in an ordinary shooting mode for the focal-plane shutter according to the first exemplary embodiment of the present invention.

An example operation for the mechanical shutter 12 in the ordinary shooting mode using the optical finder 104 (first shooting mode) is described below with reference to FIGS. 2 to 5, 7, and 9. FIG. 7 is a flowchart illustrating an example control operation for the mechanical shutter 12 in the ordinary shooting mode.

In step S11, the system control circuit 50 sets the mechanical shutter 12 into the overcharge state illustrated in FIG. 2 before a user performs an ordinary shooting mode (i.e., fully presses the shutter switch 62 to turn the switch SW2 on).

In step S12, the system control circuit 50 determines whether the shutter switch 62 is pressed (i.e., whether the switch SW2 is turned on). If a user does not press the switch SW2 (NO in step S12), the system control circuit 50 repeats the determination processing with respect to the shutter switch 62 in step S12. If a user presses the switch SW2 (YES in step S12), the control flow proceeds to step S13.

In step S13, the system control circuit 50 causes the quick return mirror 130 to rotate upward, starts energizing the first curtain coil 5 and the second curtain coil 9, and causes the charge lever 10 to rotate in the counterclockwise direction. The first-curtain charge roller 2c and the second-curtain charge roller 6c separate from the cam portions 10b and 10c of the charge lever 10 as illustrated in FIG. 3. In the pre-travel standby state illustrated in FIG. 3, the first curtain armature 3 and the second curtain armature 7 are electromagnetically locked and prevent the first-curtain driving lever 2 and the second-curtain driving lever 6 from rotating.

In step S14, the system control circuit 50 acquires temperature information from the first-curtain temperature sensor 403 and the second-curtain temperature sensor 404.

In step S15, the system control circuit 50 calculates a temperature difference ΔT (=Ta−Ts) between a temperature Ta obtained from the second-curtain temperature sensor 404 and a temperature Ts obtained from the first-curtain temperature sensor 403.

In step S16, the system control circuit 50 determines whether the temperature difference ΔT is greater than a predetermined threshold Th (e.g., 5° C.). If the system control circuit 50 determines that the temperature difference ΔT is greater than the predetermined threshold Th (YES in step S16), the control flow proceeds to step S17.

In step S17, the system control circuit 50 adds a correction time (CΔT, wherein C is a coefficient for temperature correction) to an exposure time (i.e., shutter time of seconds) T1 that is set based on a photometric result obtained by the photometry control unit 46. Namely, the system control circuit 50 obtains a corrected shutter time of seconds (=T1+CΔT). Namely, the system control circuit 50 can function as adjustment unit. If the system control circuit 50 determines that the temperature difference ΔT is not greater than the predetermined threshold Th (NO in step S16), the control flow proceeds to step S18.

In step S18, the system control circuit 50 does not correct (i.e., directly uses) the shutter time of seconds T1. It is desirable that the threshold Th for the temperature difference ΔT is a value determined considering the measurement accuracy of the first-curtain temperature sensor 403 and the second-curtain temperature sensor 404.

In step S19, the system control circuit 50 successively stops energizing the first curtain coil 5 and the second curtain coil 9 according to the shutter time of seconds obtained in step S17 or step S18, so that the image sensor 14 can be exposed to light from an object. If a user completes the sheeting operation, the charge lever 10 rotates in the clockwise direction and the cam portions 10b and 10c push the first-curtain charge roller 2c and the second-curtain charge roller 6c (i.e., perform a charge operation). Thus, the mechanical shutter 12 is brought into the state illustrated in FIG. 2 (step S11).

Figure 9:
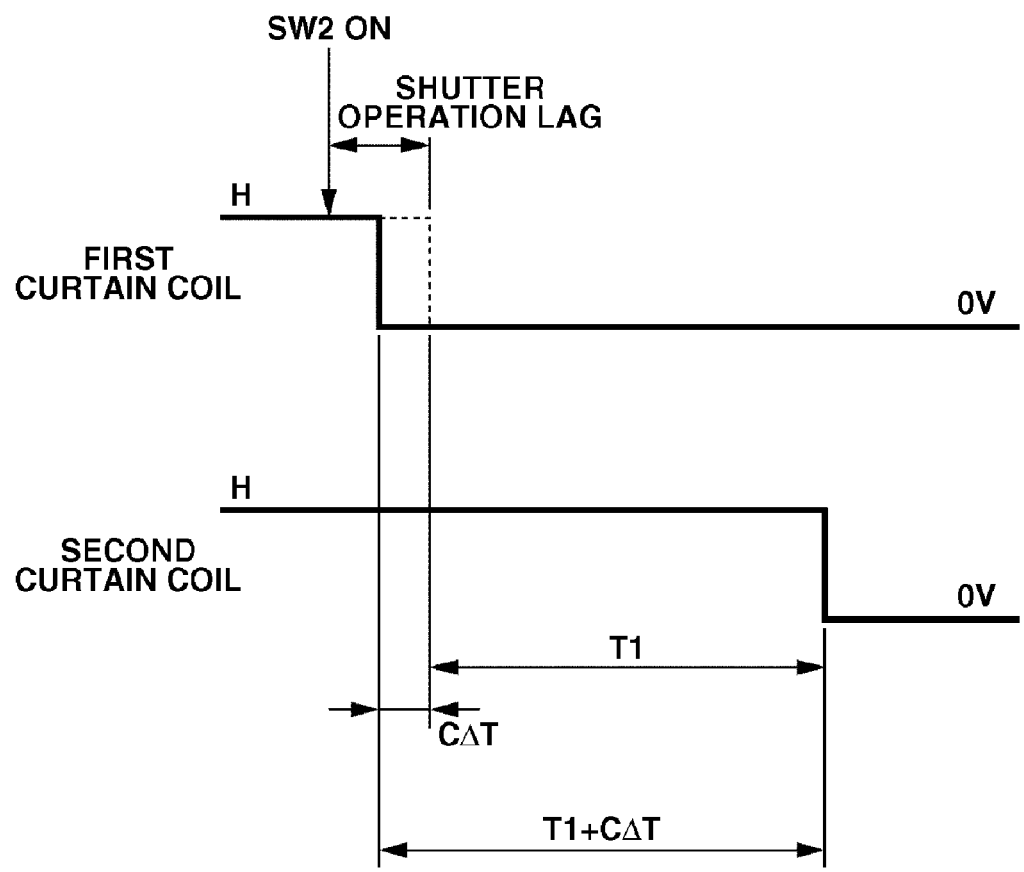
FIG. 9 is a time diagram illustrating example voltage control for a mechanical first-curtain and a mechanical second-curtain of the focal-plane shutter in the ordinary shooting mode according to the first exemplary embodiment of the present invention.

FIG. 9 is a time diagram illustrating an example voltage control operation for the first curtain and the second curtain performed in step S19.

When the switch SW2 of the shutter switch 62 is turned on, the system control circuit 50 starts energizing the first curtain coil 5 and the second curtain coil 9 to release the charge lever 10. The mechanical shutter 12 is thus brought in the pre-travel standby state illustrated in FIG. 3.

If the temperature difference ΔT is equal to or less than the predetermined threshold Th (e.g., 5° C.), the system control circuit 50 stops energizing the first curtain coil 5 when a predetermined time (hereinafter, referred to as "shutter operation lag") has elapsed after the turning-on of the switch SW2 (i.e., at the fall timing of a dotted line representing "the first curtain coil" in FIG. 9).

Thus, the mechanical shutter 12 is brought into the first-curtain travel completion state illustrated in FIG. 4. Then, when the shutter time of seconds T1 obtained in step S18 has elapsed after the system control circuit 50 stops energizing the first curtain coil 5, the system control circuit 50 stops energizing the second curtain coil 9. Thus, the mechanical shutter 12 is brought into the second-curtain travel completion state illustrated in FIG. 5.

If the temperature difference ΔT is greater than the predetermined threshold Th (e.g., 5° C.), the system control circuit 50 stops energizing the first curtain coil 5 at timing earlier than the above-described "shutter operation lag" by an amount CΔT (i.e., at the fall timing of a solid line representing "the first curtain coil" in FIG. 9). Thus, the mechanical shutter 12 is brought into the first-curtain travel completion state illustrated in FIG. 4.

Then, when the corrected shutter time of seconds T1+CΔT obtained in step S17 has elapsed after the system control circuit 50 stops energizing the first curtain coil 5, the system control circuit 50 stops energizing the second curtain coil 9.

Thus, the mechanical shutter 12 is brought into the second-curtain travel completion state illustrated in FIG. 5.

[Example Operation of Mechanical Shutter and Image Sensor in Live View Mode]

Figure 8:
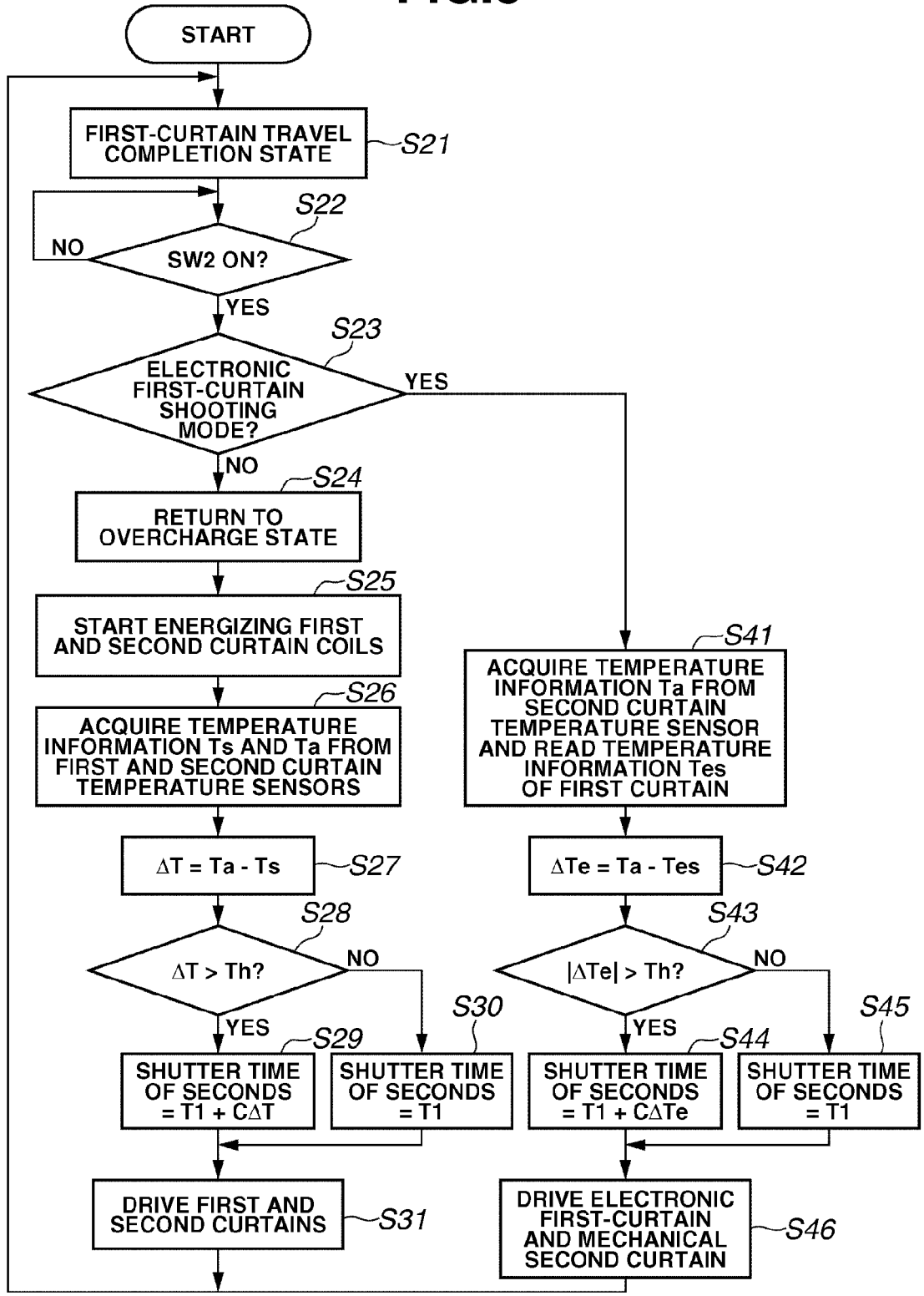
FIG. 8 is a flowchart illustrating an example shutter control operation in a live view mode for the focal-plane shutter according to the first exemplary embodiment of the present invention.

An example operation of the mechanical shutter 12 and an electronic first-curtain operation of the image sensor 14 in the live view mode using the EVF is described below with reference to FIGS. 2 to 5, 8, 10, and 11. In the live view mode, the system control circuit 50 performs a shutter control operation when a user sets the electronic first-curtain shooting mode or the mechanical first-curtain/mechanical second-curtain mode. FIG. 8 is a flowchart illustrating example processing for controlling the mechanical shutter 12 and the electronic first-curtain of the image sensor 14 in the live view mode.

When a user presses the live view mode button (i.e., one of the buttons provided on the operation unit 70) in the overcharge state illustrated in FIG. 2, the system control circuit 50 starts the processing illustrated in FIG. 8.

In step S21, the system control circuit 50 causes the quick return mirror 130 to rotate upward, starts energizing the first curtain coil 5 and the second curtain coil 9, and causes the charge lever 10 to rotate in the counterclockwise direction. Then, the first-curtain charge roller 2c and the second-curtain charge roller 6c separate from the cam portions 10b and 10c of the charge lever 10 as illustrated in FIG. 3 (i.e., the pre-travel standby state).

Next, the system control circuit 50 stops energizing the first curtain coil 5 to cause only the first curtain to travel. The mechanical shutter 12 is brought into the first-curtain travel completion state illustrated in FIG. 4, where the image sensor 14 can receive light from an object. The image sensor 14 performs capturing of an image and starts a live view operation. During the live view operation, the system control circuit 50 continues energizing the second curtain coil 9 to magnetically lock the second curtain.

In step S22, the system control circuit 50 determines whether the shutter switch 62 is pressed (i.e., whether the switch SW2 is turned on). If a user does not press the switch SW2 (NO in step S22), the system control circuit 50 repeats the determination processing with respect to the shutter switch 62 in step S22. If the switch SW2 is turned on (YES in step S22), the control flow proceeds to step S23.

In step S23, the system control circuit 50 determines whether the electronic first-curtain shooting mode is set. If the system control circuit 50 determines that the electronic first-curtain shooting mode is not set (namely, if the mechanical first-curtain/mechanical second-curtain shooting mode is set), the control flow proceeds to step S24.

In step S24, the system control circuit 50 stops energizing the second curtain coil 9 to cause the second curtain to travel and return to the second-curtain travel completion state illustrated in FIG. 5. Next, the charge lever 10 rotates in the clockwise direction and the camportions 10b and 10c press the first-curtain charge roller 2c and the second-curtain charge roller 6c (i.e., performs the charge operation). Thus, the mechanical shutter 12 is brought into the overcharge state illustrated in FIG. 2.

In step S25, after completing the charge operation, the system control circuit 50 starts energizing the first curtain coil 5 and the second curtain coil 9. The charge lever 10 rotates in the counterclockwise direction. The first-curtain charge roller 2c and the second-curtain charge roller 6c separate from the camportions 10b and 10c of the charge lever 10 as illustrated in FIG. 3 (i.e., the pre-travel standby state).

In step S26, the system control circuit 50 acquires temperature information from the first-curtain temperature sensor 403 and the second-curtain temperature sensor 404.

In step S27, the system control circuit 50 calculates a temperature difference $\Delta T$ ($=Ta-Ts$) between a temperature Ts obtained from the first-curtain temperature sensor 403 and a temperature Ta obtained from the second-curtain temperature sensor 404.

In step S28, the system control circuit 50 determines whether the temperature difference $\Delta T$ is greater than a predetermined threshold Th (e.g., 5° C.). Then, if the system control circuit 50 determines that the temperature difference $\Delta T$ is greater than the predetermined threshold Th (YES in step S28), the control flow proceeds to step S29.

In step S29, the system control circuit 50 adds a correction time (C$\Delta T$, where C is a coefficient for temperature correction) to an exposure time (i.e., shutter time of seconds) T1 that is set based on a photometric result obtained by the photometry control unit 46. Namely, the system control circuit 50 obtains a corrected shutter time of seconds (=T1+C$\Delta T$). If the system control circuit 50 determines that the temperature difference $\Delta T$ is not greater than the predetermined threshold Th (NO in step S28), the control flow proceeds to step S30.

In step S30, the system control circuit 50 does not correct (i.e., directly uses) the shutter time of seconds T1. It is desirable that the threshold Th for the temperature difference $\Delta T$ is a value determined considering the measurement accuracy of the first-curtain temperature sensor 403 and the second-curtain temperature sensor 404.

In step S31, the system control circuit 50 successively stops energizing the first curtain coil 5 and the second curtain coil 9 according to the shutter time of seconds obtained in step S29 or step S30, so that the image sensor 14 can be exposed to light from an object. If a user completes the sheeting operation, the system control circuit 50 performs the above-described procedure for bringing the mechanical shutter 12 into the first-curtain travel completion state illustrated in FIG. 4 and continues the live view operation (step S21).

If the system control circuit 50 determines that the electronic first-curtain shooting mode is set (YES in step S23), the control flow proceeds to step S41.

In step S41, the system control circuit 50 receives an output from the second-curtain temperature sensor 404 and reads temperature information from the nonvolatile memory 56 (e.g., EEPROM) that stores first-curtain temperature information during the electronic first-curtain adjustment performed in a camera assembling process.

In step S42, the system control circuit 50 calculates a temperature difference $\Delta Te$ ($=Ta-Tes$) between the temperature Ta obtained from the second-curtain temperature sensor 404 and a temperature Tes obtained from the first-curtain temperature sensor 403 during the electronic first-curtain adjustment.

In step S43, the system control circuit 50 determines whether an absolute value $|\Delta Te|$ of the temperature difference is greater than a predetermined threshold Th (e.g., 5° C.). If the system control circuit 50 determines that the absolute value $|\Delta Te|$ is greater than the predetermined threshold Th (YES in step S43), the control flow proceeds to step S44.

In step S44, the system control circuit 50 adds a correction time (C$\Delta Te$, wherein C is a coefficient for temperature correction) to an exposure time (i.e., shutter time of seconds) T1 that is set based on a photometric result obtained by the photometry control unit 46. Namely, the system control circuit 50 obtains a corrected shutter time of seconds (=T1+C$\Delta Te$). If the system control circuit 50 determines that the absolute value $|\Delta Te|$ of the temperature difference is not greater than the predetermined threshold Th (NO in step S43), the control flow proceeds to step S45.

In step S45, the system control circuit 50 does not correct (i.e., directly uses) the shutter time of seconds T1. It is desirable that the threshold Th for the temperature difference ΔT and for the absolute value |ΔTes| of the temperature difference is a value determined considering the measurement accuracy of the first-curtain temperature sensor 403 and the second-curtain temperature sensor 404.

In step S46, the system control circuit 50 resets the image sensor 14 (electronic first-curtain) according to the shutter time of seconds obtained in step S44 or step S45 and stops energizing the second curtain coil 9 so that the image sensor 14 can be exposed to light from an object. If a user completes the sheeting operation, the system control circuit 50 performs the above-described procedure for bringing the mechanical shutter 12 into the first-curtain travel completion state illustrated in FIG. 4 and continues the live view operation (step S21).

Figure 10:
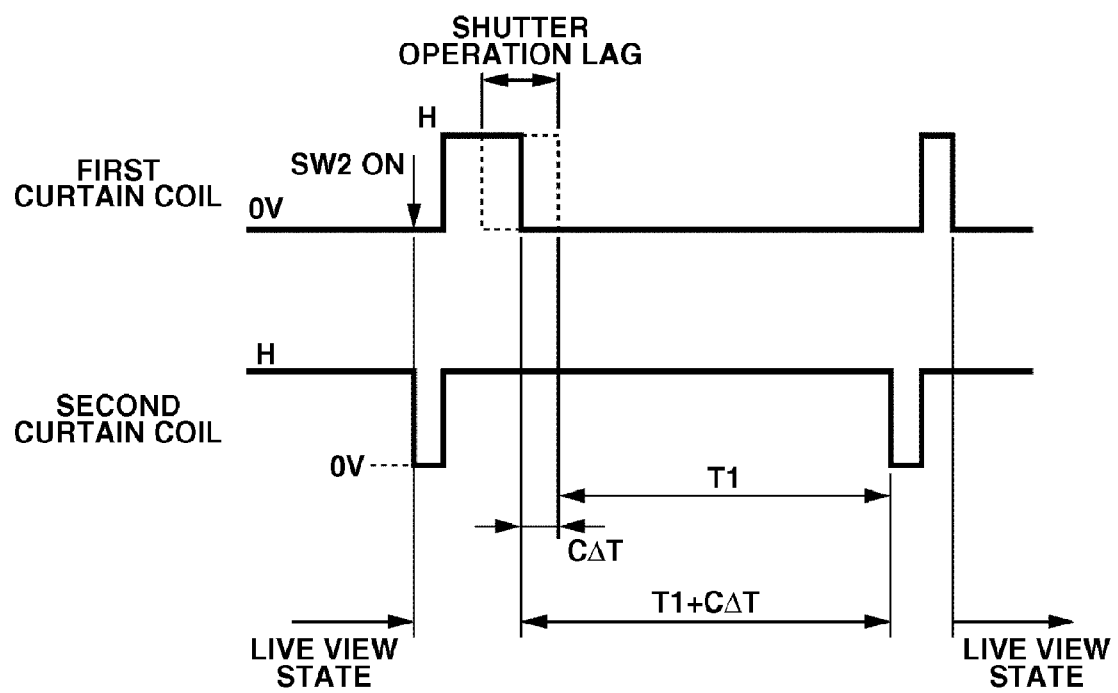
FIG. 10 is a time diagram illustrating example voltage control for the mechanical first-curtain and the mechanical second-curtain of the focal-plane shutter in the live view mode according to the first exemplary embodiment of the present invention.

FIG. 10 is a time diagram illustrating an example voltage control operation for the first curtain and the second curtain of the mechanical shutter 12 performed in step S31. When the switch SW2 of the shutter switch 62 is turned on in the live view state (i.e., in the first-curtain travel completion state illustrated in FIG. 4), the system control circuit 50 stops energizing the second curtain coil 9 and performs the charge operation. Then, the system control circuit 50 starts energizing the first curtain coil 5 and the second curtain coil 9 to release the charge lever 10. Thus, the mechanical shutter 12 is brought in the pre-travel standby state illustrated in FIG. 3.

If the temperature difference ΔT is equal to or less than the predetermined threshold Th (e.g., 5° C.), the system control circuit 50 stops energizing the first curtain coil 5 when a predetermined time ("shutter operation lag") has elapsed after the turning-on of the switch SW2 (i.e., at the fall timing of a dotted line representing "the first curtain coil" in FIG. 10). Thus, the mechanical shutter 12 is brought into the first-curtain travel completion state illustrated in FIG. 4.

Then, if the shutter time of seconds T1 obtained in step S30 has elapsed after the system control circuit 50 stops energizing the first curtain coil 5, the system control circuit 50 stops energizing the second curtain coil 9. Thus, the mechanical shutter 12 is brought into the second-curtain travel completion state illustrated in FIG. 5.

If the temperature difference ΔT is greater than the predetermined threshold Th (e.g., 5° C.), the system control circuit 50 stops energizing the first curtain coil 5 at timing earlier than the above-described "shutter operation lag" by an amount CΔT (i.e., at the fall timing of a solid line representing "the first curtain coil" in FIG. 10). Thus, the mechanical shutter 12 is brought into the first-curtain travel completion state illustrated in FIG. 4.

Then, if the corrected shutter time of seconds T1+CΔT has elapsed after the mechanical shutter 12 stops energizing the first curtain coil 5, the system control circuit 50 stops energizing the second curtain coil 9. Thus, the mechanical shutter 12 is brought into the second-curtain travel completion state illustrated in FIG. 5.

Next, the system control circuit 50 performs the charge operation to realize the overcharge state illustrated in FIG. 2. Then, the system control circuit 50 starts energizing the first curtain coil 5 and the second curtain coil 9 to release the charge lever 10 (i.e., the pre-travel standby state illustrated in FIG. 3). After a predetermined time has elapsed, the system control circuit 50 stops energizing the first curtain coil 5 to bring the mechanical shutter 12 into the first-curtain travel completion state illustrated in FIG. 4. In this state, the image sensor 14 captures an image to restart the live view operation.

Figure 11:
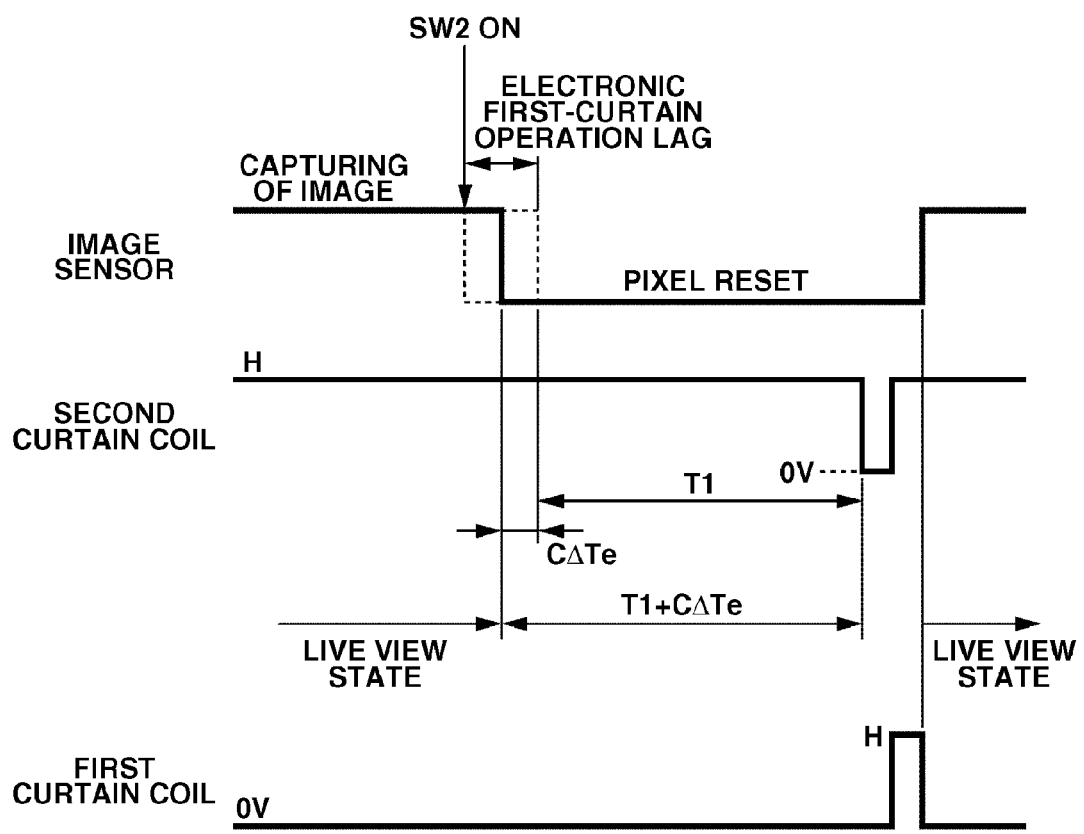
FIG. 11 is a time diagram illustrating example voltage control for the mechanical first-curtain and the mechanical second-curtain of the focal-plane shutter and example control for an image sensor (electronic first-curtain) in the live view mode according to the first exemplary embodiment of the present invention.

FIG. 11 is a time diagram illustrating an example voltage control operation for the electronic first-curtain and the mechanical second-curtain operation performed in step S46. If the switch SW2 of the shutter switch 62 is turned on in the live view state (i.e., in the first-curtain travel completion state illustrated in FIG. 4), and if the absolute value |ΔTe| of the temperature difference is equal to or less than a predetermined threshold Th (e.g., 5° C.), the system control circuit 50 starts pixel reset scanning (travel of the electronic first-curtain) for the image sensor 14 when a predetermined time (hereafter, referred to as "electronic first-curtain operation lag") has elapsed after turning-on of the switch SW2 (i.e., at the fall timing of a dotted line representing "the image sensor" in FIG. 11).

Then, if the shutter time of seconds T1 obtained in step S45 has elapsed after starting the travel of the electronic first-curtain, the system control circuit 50 stops energizing the second curtain coil 9. Thus, the mechanical shutter 12 is brought into the second-curtain travel completion state illustrated in FIG. 5.

If the absolute value |ΔTe| of the temperature difference is greater than the predetermined threshold Th (e.g., 5° C.), the system control circuit 50 starts the reset scanning (travel of the electronic first-curtain) for the image sensor 14 at timing earlier than the above-described "electronic first-curtain operation lag" by an amount CΔTe (i.e., at the fall timing of a solid line representing "the image sensor" in FIG. 11).

Then, if the shutter time of seconds T1+CΔTe obtained in step S44 has elapsed after starting the travel of the electronic first-curtain, the system control circuit 50 stops energizing the second curtain coil 9. Thus, the mechanical shutter 12 is brought into the second-curtain travel completion state illustrated in FIG. 5.

Next, the system control circuit 50 performs the charge operation to realize the overcharge state illustrated in FIG. 2. Then, the system control circuit 50 starts energizing the first curtain coil 5 and the second curtain coil 9 to release the charge lever 10 (i.e., the pre-travel standby state illustrated in FIG. 3). After a predetermined time has elapsed, the system control circuit 50 stops energizing the first curtain coil 5 to bring the mechanical shutter 12 into the first-curtain travel completion state illustrated in FIG. 4. In this state, the image sensor 14 captures an image to restart the live view operation.

Figure 12:
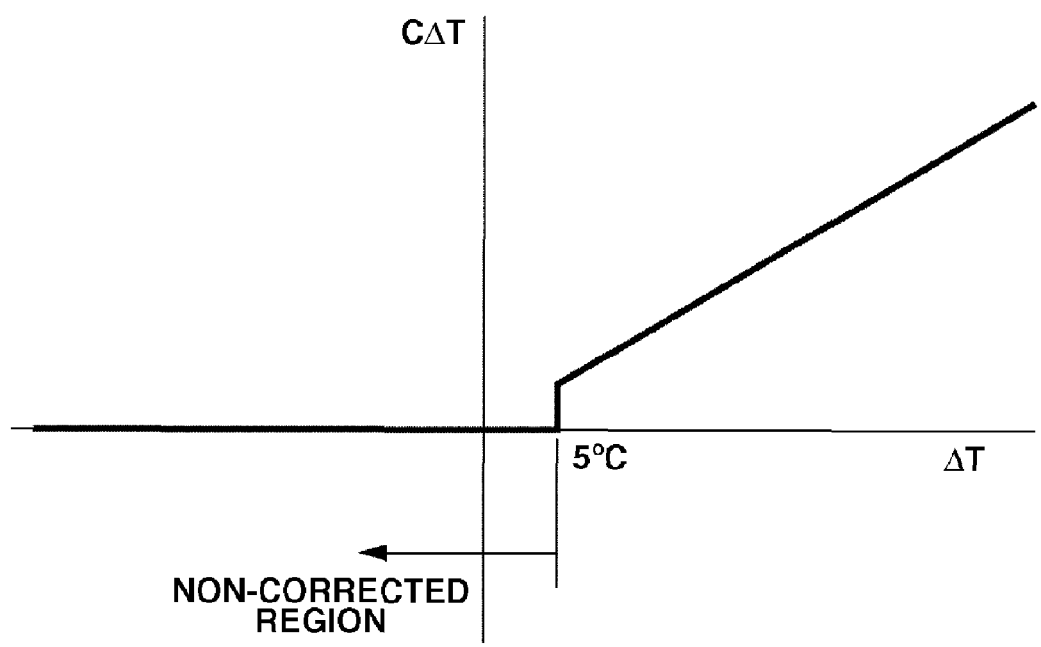
FIG. 12 is a graph illustrating a relationship between a temperature difference $\Delta T$ in the focal-plane shutter and a control time correction amount $C\Delta T$ for a mechanical shutter according to the first exemplary embodiment of the present invention.
Figure 13:
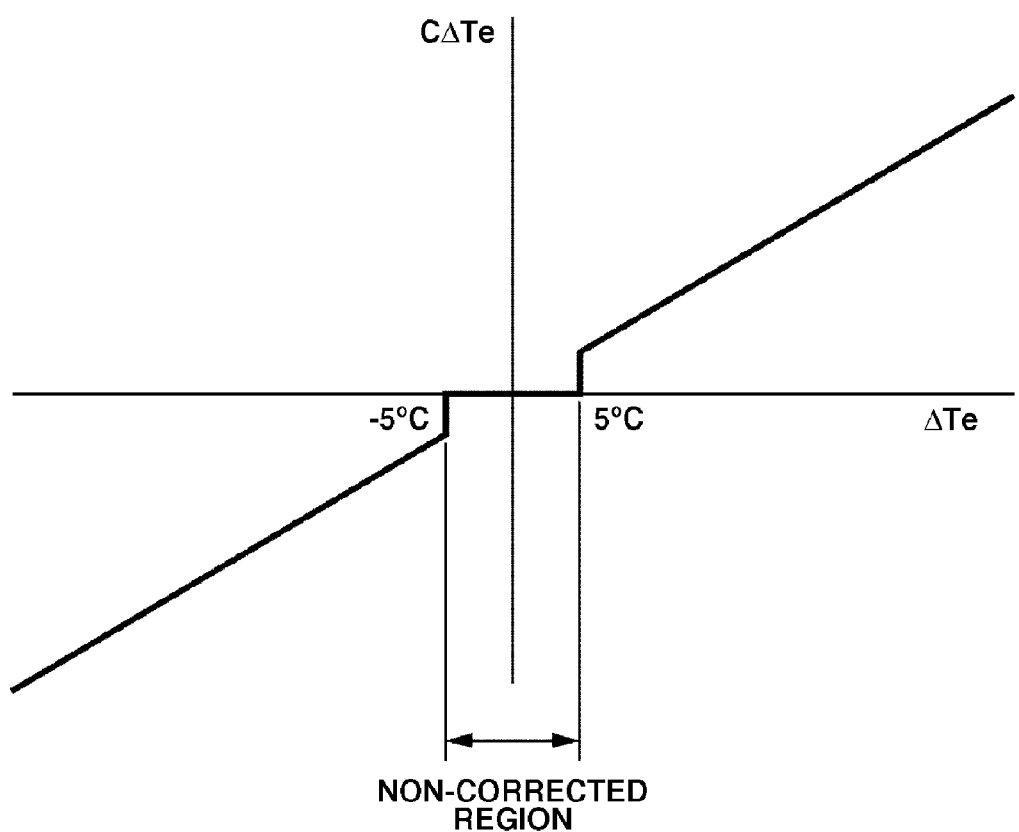
FIG. 13 is a graph illustrating a relationship between a temperature difference ΔTe in the focal-plane shutter and a control time correction amount CΔTe for the electronic first-curtain according to the first exemplary embodiment of the present invention.

FIG. 12 illustrates a relationship between the temperature difference ΔT and the correction amount CΔT. FIG. 13 illustrates a relationship between the temperature difference ΔTe and the correction amount CΔTe. The threshold Th for the temperature difference ΔT is a criterion to determine the correction for the shutter time of seconds and is set to 5° C. according to the example illustrated in FIG. 12. If a relationship ΔT≦5° C. is satisfied, the correction amount CΔT for the "shutter operation lag" is 0. If a relationship ΔT>5° C. is satisfied, the correction amount CΔT for the "shutter operation lag" varies in proportion to the temperature difference ΔT.

Furthermore, the threshold Th for the temperature difference ΔTe is a criterion to determine the correction for the shutter time of seconds and is set to 5° C. according to the example illustrated in FIG. 13. If a relationship −5° C.≦ΔTe≦5° C. is satisfied, the correction amount CΔTe for the "electronic first-curtain operation lag" is 0. If a relationship ΔTe<−5° C. or ΔTe>5° C. is satisfied, the correction amount CΔTe for the "electronic first-curtain operation lag" varies in proportion to the temperature difference ΔTe.

Although the correction amounts CΔT and CΔTe are not limited to specific values, the correction amount CΔT for the "shutter operation lag" can have an upper-limit value and the correction amount C$\Delta$Te for the "electronic first-curtain operation lag" can have both an upper-limit value and a lower-limit value.

Figure 14:
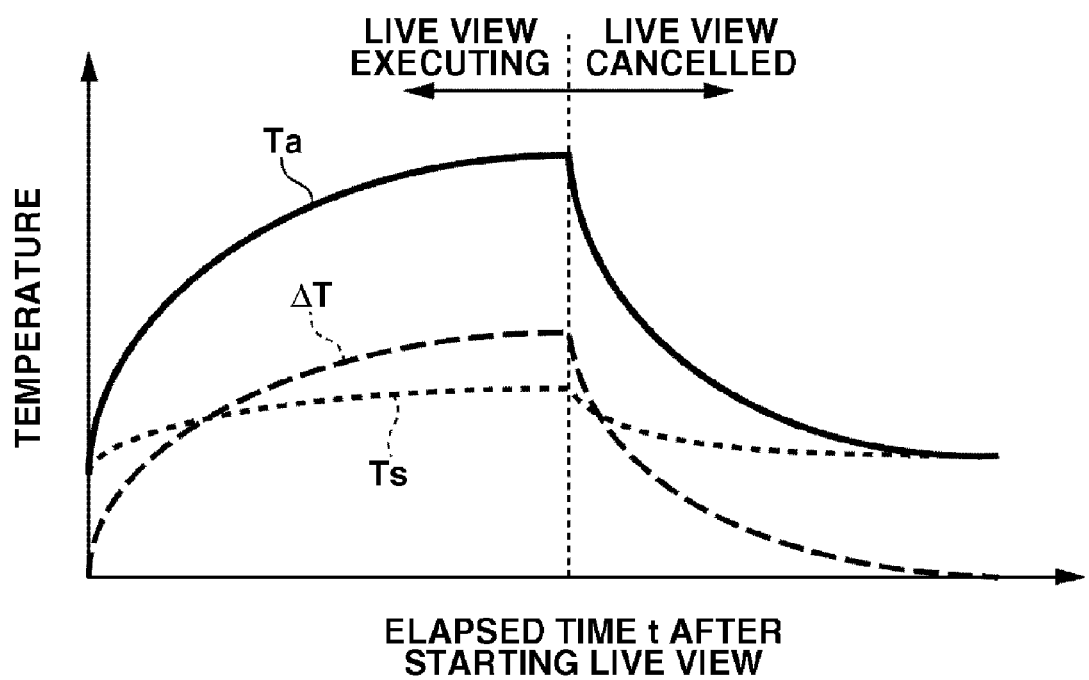
FIG. 14 is a graph illustrating first-curtain temperature Ts, second-curtain temperature Ta, and temperature difference ΔT that change after starting a live view operation of the focal-plane shutter according to the first exemplary embodiment of the present invention.
Figure 15:
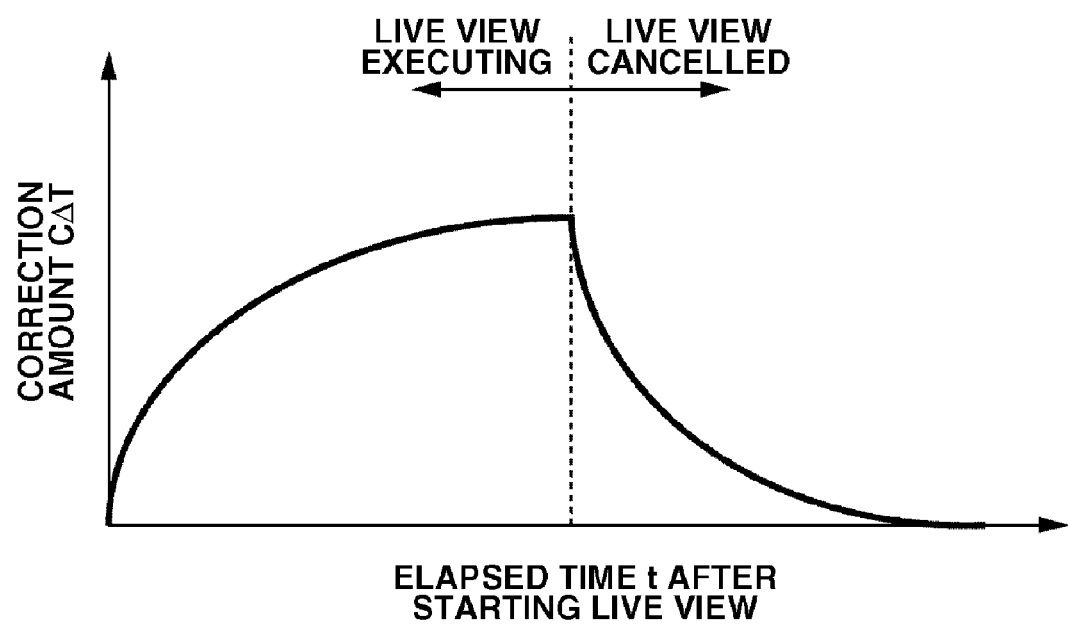
FIG. 15 is a graph illustrating the control time correction amount CΔT that changes after starting the live view operation of the focal-plane shutter according to the first exemplary embodiment of the present invention.
Figure 16:
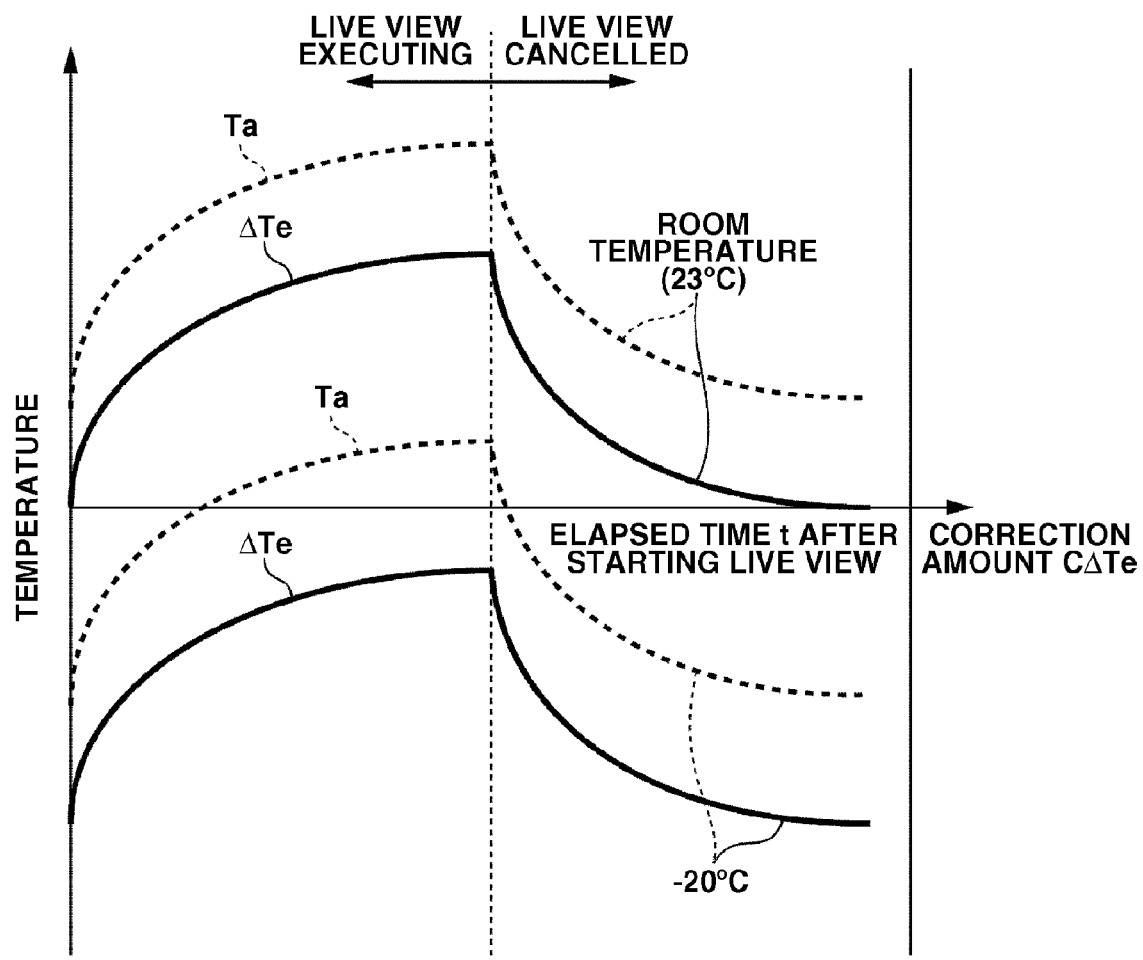
FIG. 16 is a graph illustrating the second-curtain temperature Ta, the temperature difference ΔTe, and the control time correction amount CΔTe in respective ambient temperatures, which change after starting the live view operation of the focal-plane shutter according to the first exemplary embodiment of the present invention.

FIGS. 14 to 16 illustrate temperatures of the first curtain coil 5 and the second curtain coil 9 and the operation lag correction amount which respectively change during execution of the live view operation and in the live view cancelled state.

FIG. 14 illustrates changes of the temperature Ts of the first-curtain temperature sensor 403, the temperature Ta of the second-curtain temperature sensor 404, and the temperature difference $\Delta$T (=Ta−Ts) between the second-curtain temperature sensor 404 and the first-curtain temperature sensor 403 during execution of the live view operation and in the live view canceled state (i.e., after stopping energizing the second curtain).

During execution of the live view operation, the temperature Ta of the second-curtain temperature sensor 404 greatly increases when the live view continuation time (i.e., second curtain energization time) increases. During execution of the live view operation, electric power is not supplied to the first curtain coil 5. Therefore, the temperature Ts of the first-curtain temperature sensor 403 does not increase so much compared to the temperature Ta of the second-curtain temperature sensor 404. On the other hand, the temperature difference $\Delta$T (=Ta−Ts) between the second-curtain temperature sensor 404 and the first-curtain temperature sensor 403 greatly increases when the live view continuation time (i.e., second curtain energization time) increases.

After the live view operation is cancelled, both the temperature Ts of the first-curtain temperature sensor 403 and the temperature Ta of the second-curtain temperature sensor 404 decrease according to the time elapsing after cancellation of the live view operation (i.e., elapsed time after stoppage of energizing the second curtain). The temperature difference $\Delta$T between the second-curtain temperature sensor 404 and the first-curtain temperature sensor 403 decreases correspondingly.

FIG. 15 illustrates the correction amount C$\Delta$T for the "shutter operation lag" that changes during execution of the live view operation and in the live view canceled state (i.e., after stopping energizing the second curtain). During execution of the live view operation, the correction amount C$\Delta$T for the "shutter operation lag" increases when the live view continuation time (i.e., second curtain energization time) increases. After the live view operation is cancelled, the correction amount C$\Delta$T for the "shutter operation lag" decreases according to the time elapsing after cancellation of the live view operation (i.e., elapsed time after stoppage of energizing the second curtain).

FIG. 16 illustrates the temperature Ta of the second-curtain temperature sensor 404, the temperature difference $\Delta$Te (=Ta−Tes) between the temperature Ta and the first-curtain temperature Tes in the electronic first-curtain adjustment, and the correction amount C$\Delta$Te for the "electronic first-curtain operation lag" which respectively change during execution of the live view operation and in the live view canceled state (i.e., after stopping energizing the second curtain). In this case, the first-curtain temperature Tes in the electronic first-curtain adjustment is 23° C.

In each temperature environment, during execution of the live view operation, the temperature Ta of the second-curtain temperature sensor 404 greatly increases when the live view continuation time (i.e., second curtain energization time) increases. Thus, the temperature difference $\Delta$Te (=Ta−Tes) between the temperature Ta of the second-curtain temperature sensor 404 and the first-curtain temperature Tes in the electronic first-curtain adjustment greatly increases when the live view continuation time (i.e., second curtain energization time) increases.

In a temperature environment of −20° C., the temperature Ta of the second-curtain temperature sensor 404 is not greater than the first-curtain temperature Tes (=23° C.) in the electronic first-curtain adjustment even during execution of the live view operation. Therefore, the temperature Ta is always a negative value. Therefore, the correction amount C$\Delta$Te for the "electronic first-curtain operation lag" is a negative value. Thus, in the control for the electronic first-curtain, the system control circuit 50 adds the correction amount C$\Delta$Te to the "electronic first-curtain operation lag."

In each temperature environment, after the live view operation is cancelled, the correction amount C$\Delta$Te for the "electronic first-curtain operation lag" decreases according to the time elapsing after cancellation of the live view operation (i.e., elapsed time after stoppage of energizing the second curtain). According to the examples illustrated in FIGS. 14 to 16, the live view operation is not performed after the live view operation is cancelled (i.e., after stopping energizing the second curtain).

As illustrated in FIGS. 14 and 16, if the live view operation (or shooting operation) continues for a long time, the temperature of the second curtain coil 9 increases and the electric resistance of the second curtain coil 9 increases correspondingly. If the resistance increases, the current flowing through the second curtain coil 9 decreases. Therefore, the second curtain armature 7 and the second curtain yoke 8 separate from each other at earlier timing (with a short time lag). On the other hand, electric power is not supplied to the first curtain coil 5. Therefore, the temperature of the first curtain coil 5 does not increase. The timing the first curtain armature 3 and the first curtain yoke 4 separate from each other (i.e., time lag) does not change if the ambient temperature is constant. Therefore, the actual exposure time becomes shorter.

Hence, as illustrated in FIG. 12, the system control circuit 50 determines the correction amount C$\Delta$T for the "shutter operation lag" according to the temperature difference $\Delta$T between the temperature Ta of the second-curtain temperature sensor 404 and the temperature Ts of the first-curtain temperature sensor 403. Thus, the system control circuit 50 can perform an accurate exposure control operation regardless of ambient temperature after completing the live view operation in which the shutter opens for a long time.

Furthermore, in the electronic first-curtain shooting mode, the timing the electronic first-curtain starts traveling (i.e., pixel reset start timing of the image sensor 14) is constant regardless of ambient temperature. Therefore, the accuracy in exposure control is dependent on timing the second curtain armature 7 and the second curtain yoke 8 separate from each other (i.e., time lag).

Hence, as illustrated in FIG. 13, the system control circuit 50 determines the correction amount C$\Delta$Te for the "electronic first-curtain operation lag" according to the temperature difference $\Delta$Te (=Ta−Tes) between the temperature Ta of the second-curtain temperature sensor 404 and the temperature Tes of the first-curtain temperature sensor 403 in the electronic first-curtain adjustment. Thus, the system control circuit 50 can perform an accurate exposure control operation regardless of ambient temperature after completing the live view operation in which the shutter opens for a long time.

Furthermore, the system control circuit 50 changes a correction amount by discriminating a shooting mode operation (using the mechanical first-curtain and the mechanical second-curtain) and an electronic first-curtain shooting operation (using the electronic first-curtain and the mechanical second-curtain). Thus, the system control circuit 50 can perform an appropriate correction according to a changing exposure.

Furthermore, providing thresholds for the temperature differences ΔT and ΔTe can prevent the system control circuit 50 from correcting the control time (operation lag) according to differences in the measurement accuracy of the first-curtain temperature sensor 403 and the second-curtain temperature sensor 404.

In an exemplary embodiment, the system control circuit 50 controls the exposure time by correcting the shutter control time (shutter operation lag). However, the present invention is not limited to the above-described embodiment. For example, if an image is captured without changing the shutter time of seconds, the image processing circuit 20 can adjust a gain value for the gain correction (in the development process) by an amount corresponding to a correction amount for the shutter time of seconds. Furthermore, the temperature correction coefficient C is not limited to a constant value.

In an exemplary embodiment, the temperature correction coefficient C is changeable according to the temperature of the first-curtain temperature sensor 403.

Furthermore, in the above-described exemplary embodiment, the mechanical shutter 12 includes both the first curtain and the second curtain while usage of the mechanical first-curtain and usage of the electronic first-curtain are selectable. The present invention is not limited to the above-described embodiment. In an exemplary embodiment, the mechanical shutter 12 can include only the second curtain and can constantly use the electronic first-curtain.

Second Exemplary Embodiment

Figure 17:
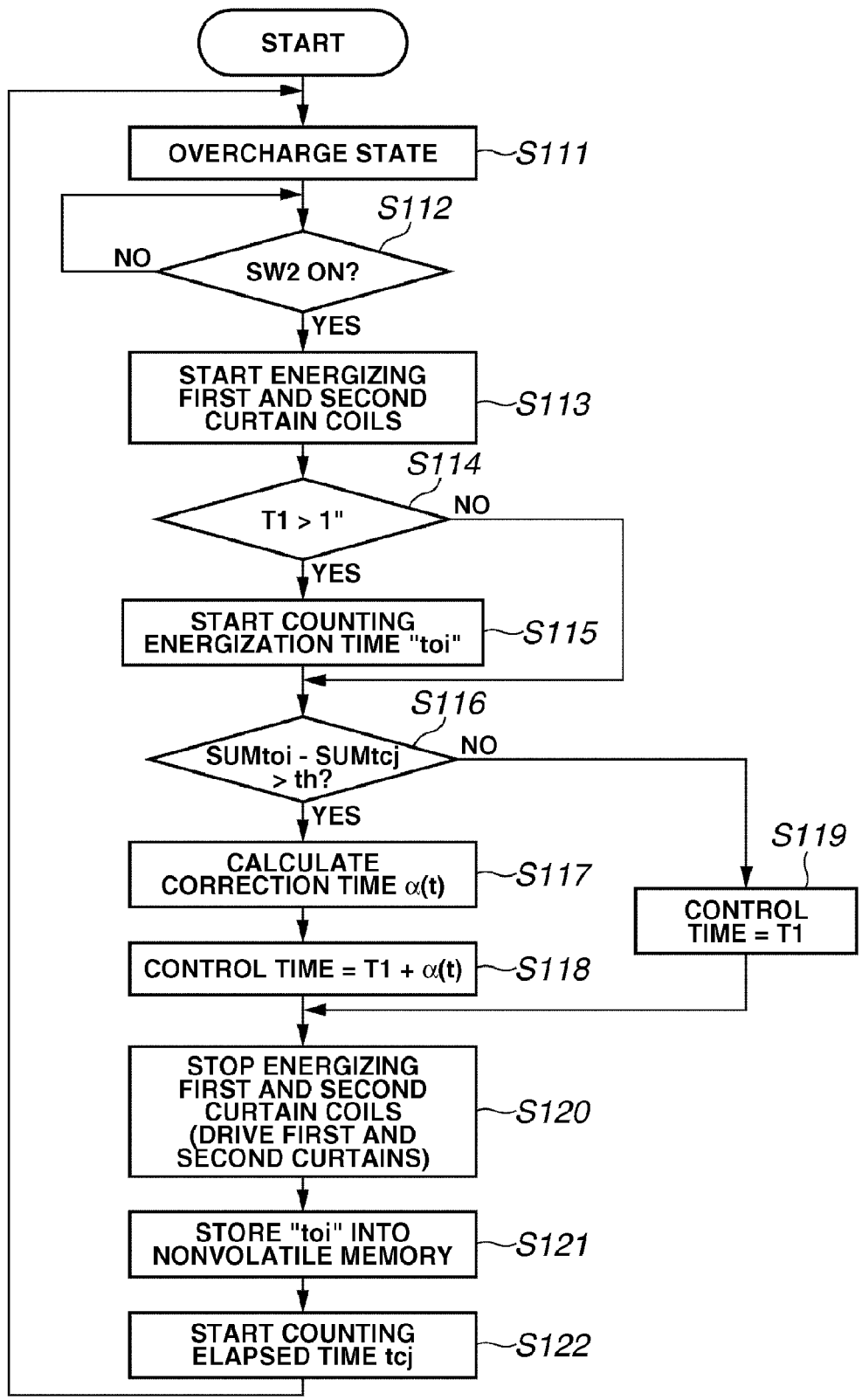
FIG. 17 is a flowchart illustrating an example shutter control operation in the ordinary shooting mode for the focal-plane shutter according to a second exemplary embodiment of the present invention.

FIG. 17 is a flowchart illustrating an example control operation for the mechanical shutter 12 in the ordinary shooting mode according to a second exemplary embodiment of the present invention. In this exemplary embodiment, constituent components similar to those described in the first exemplary embodiment are denoted by the same reference numerals.

In step S111, the system control circuit 50 sets the mechanical shutter 12 into the overcharge state illustrated in FIG. 2 before a user performs an ordinary shooting mode (i.e., fully presses the shutter switch 62 to turn on the switch SW2).

In step S112, the system control circuit 50 determines whether the shutter switch 62 is pressed (i.e., whether the switch SW2 is turned on). If a user does not press the switch SW2 (NO in step S112), the system control circuit 50 repeats the determination processing with respect to the shutter switch 62 in step S112. If the switch SW2 is turned on (YES in step S112), the control flow proceeds to step S113.

In step S113, the system control circuit 50 causes the quick return mirror 130 to rotate upward, starts energizing the first curtain coil 5 and the second curtain coil 9, and causes the charge lever 10 to rotate in the counterclockwise direction.

The first-curtain charge roller 2c and the second-curtain charge roller 6c separate from the cam portions 10b and 10c of the charge lever 10 as illustrated in FIG. 3. In the pre-travel standby state illustrated in FIG. 3, the first curtain armature 3 and the second curtain armature 7 are electromagnetically locked and prevent the first-curtain driving lever 2 and the second-curtain driving lever 6 from rotating.

In step S114, the system control circuit 50 determines whether the shutter time of seconds (Tv value, e.g., T1 in this embodiment) is greater than a predetermined time of seconds (e.g., 1 sec). If the system control circuit 50 determines that the shutter time of seconds is equal to or less than the predetermined time of seconds (e.g., 1 sec), the temperature increase in the second curtain coil 9 is small. Therefore, the control flow proceeds to step S116.

If the system control circuit 50 determines that the shutter time of seconds is greater than the predetermined time of seconds (e.g., 1 sec), the control flow proceeds to step S115.

In step S115, the system control circuit 50 instructs the timer 58 to start counting the energization time "toi" of the second curtain coil 9.

In step S116, the system control circuit 50 performs the following processing. First, the system control circuit 50 obtains a sum SUMtoi (i=1 to m) of the energization time "toi" for the second curtain coil 9 in the latest m (at least one) shooting operations. In this case, "tom" (i.e., i=m) represents an estimated energization time for the second curtain coil 9 in the present shooting operation, which is equal to the shutter time of seconds T1.

Next, the system control circuit 50 obtains a sum SUMtcj (j=1 to m−1) of elapsed time "tcj" which represents a period of time having elapsed before the system control circuit 50 restarts energizing the second curtain coil 9 for the next shooting operation after completing the latest m−1 (at least one) shooting operations (i.e., from the timing the system control circuit 50 once stops energizing the second curtain coil 9). Then, the system control circuit 50 calculates a difference SUMtoi−SUMtcj (i=1 to m and j=1 to m−1) between two sums. The system control circuit 50 determines whether the difference SUMtoi−SUMtcj is greater than a predetermined threshold "th" (e.g., 30 sec). If the system control circuit 50 determines that the difference SUMtoi−SUMtcj is greater than the predetermined threshold "th" (e.g., 30 sec) (YES in step S116), the control flow proceeds to step S117.

In step S117, the system control circuit 50 calculates a correction time $\alpha(t)$.

In step S118, the system control circuit 50 adds the correction time $\alpha(t)$ to an exposure time (i.e., shutter time of seconds) T1 that is set based on a photometric result obtained by the photometry control unit 46. In other words, the system control circuit 50 obtains a corrected shutter time of seconds T1+$\alpha(t)$. Namely, the system control circuit 50 can function as exposure time adjustment unit.

In this embodiment, the system control circuit 50 calculates the correction time $\alpha(t)$ based on an energization time "to" and an elapsed time "tc" according to the following functional equation (a correction function).

$$\alpha(t) = C1(A(\text{SUM}toi^3) + B(\text{SUM}toi^2) + C(\text{SUM}toi) + D) - C2\,\text{Ln}(\text{SUM}tcj)$$

where i=1 to m and j=1 to m−1, while A, B, C, D, C1, and C2 are time correction coefficients.

If the system control circuit 50 determines that the difference SUMtoi−SUMtcj (i=1 to m and j=1 to m−1) is equal to or less than the predetermined threshold "th" (NO in step S116), the control flow proceeds to step S119.

In step S119, the system control circuit 50 does not correct (i.e., directly uses) the shutter time of seconds T1. It is desirable that the threshold "th" for the difference SUMtoi−SUMtcj between the energization time and the elapsed time is a value determined considering the temperature increase in the second curtain coil 9, which has an effect on the shutter accuracy.

Then, in step S120, the system control circuit 50 successively stops energizing the first curtain coil 5 and the second curtain coil 9 according to the shutter time of seconds obtained in step S118 or S119, so that the image sensor 14 can be exposed to light from an object.

In step S121, the system control circuit 50 stores the energization time "toi" for the present shooting operation into the nonvolatile memory 56 (e.g., EEPROM).

In step S122, the system control circuit 50 instructs the timer 58 to start counting the elapsed time "tcj" (i.e., a time having elapsed before starting the next shooting operation after completing the present shooting operation).

If a user completes the shooting operation, the system control circuit 50 causes the charge lever 10 to rotate in the clockwise direction while the cam portions 10b and 10c press the first-curtain charge roller 2c and the second-curtain charge roller 6c (i.e., performs the charge operation). Thus, the mechanical shutter 12 is brought into the overcharge state illustrated in FIG. 2 (step S111).

If in step S122 the elapsed time "tcj" is greater than a predetermined time "tcmax" (e.g., 30 min), the system control circuit 50 executes a reset operation for deleting the energization time "toi" and the elapsed time "tcj" stored in the nonvolatile memory 56 (e.g., EEPROM). Similarly, if a user turns the power switch 72 off, the system control circuit 50 executes a reset operation for deleting the energization time "toi" and the elapsed time "tcj" stored in the nonvolatile memory 56 (e.g., EEPROM).

Figure 23A:
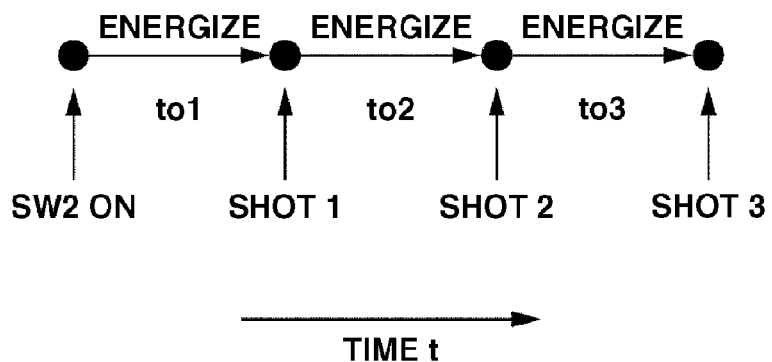
FIGS. 23A and 23B illustrate example energization time and example deenergization time (elapsed time) for the second curtain coil in the ordinary shooting mode of the focal-plane shutter according to the second exemplary embodiment of the present invention.
Figure 23B:
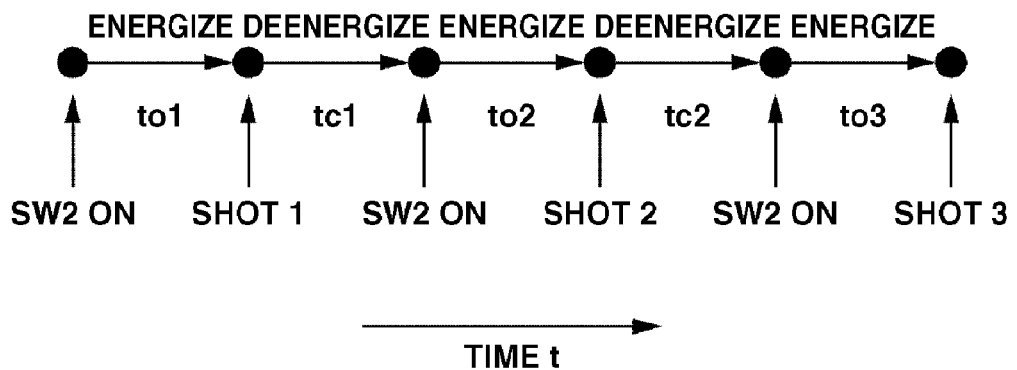

FIGS. 23A and 23B illustrate an example camera operation in a shooting operation using the optical finder, wherein the abscissa axis represents time t. FIG. 23A illustrates an example camera operation in a continuous shooting mode In this case, at respective shots 1 to 3, the following expression can be used for the left side of the determination formula used in step S116 in FIG. 17:

| | |
|---|---|
| to1 | Shot 1 |
| to1+to2 | Shot 2 |
| to1+to2+to3 | Shot 3 |

In this case, the deenergization time for the second curtain coil 9 is sufficiently short in the continuous shooting operation and is negligible.

Furthermore, FIG. 23B illustrates an example camera operation in a single shooting mode In this case, at respective shots 1 to 3, the following expression can be used for the left side of the determination formula used in step S116 in FIG. 17:

| | |
|---|---|
| to1 | Shot 1 |
| to1+to2−tc1 | Shot 2 |
| to1+to2+to3−(tc1+tc2) | Shot 3 |

Figure 20:
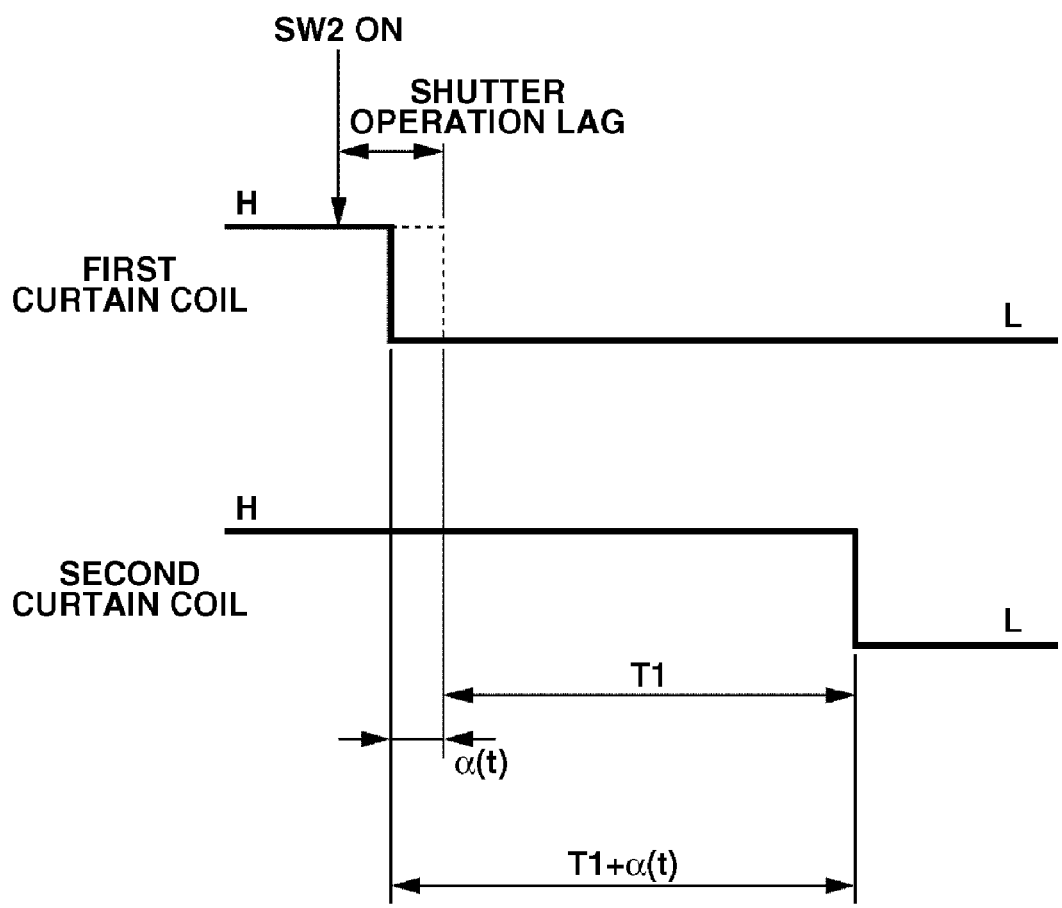
FIG. 20 is a time diagram illustrating example voltage control for the mechanical first-curtain and the mechanical second-curtain of the focal-plane shutter in the ordinary shooting mode according to the second exemplary embodiment of the present invention.

FIG. 20 is a time diagram illustrating an example voltage control operation for the first curtain and the second curtain performed in step S120. If the switch SW2 of the shutter switch 62 is turned on, the system control circuit 50 starts energizing the first curtain coil 5 and the second curtain coil 9 to release the charge lever 10. Thus, the mechanical shutter 12 is brought into the pre-travel standby state illustrated in FIG. 3.

If the difference SUMtoi−SUMtcj between the energization time and the elapsed time is equal to or less than the predetermined threshold "th" (e.g., threshold "th"≦30 sec), the system control circuit 50 performs the following control. Namely, the system control circuit 50 stops energizing the first curtain coil 5 when a predetermined time (hereinafter, referred to as "shutter operation lag") has elapsed after turning-on of the switch SW2 (i.e., at the fall timing of a dotted line representing "the first curtain coil" in FIG. 20).

Thus, the mechanical shutter 12 is brought into the first-curtain travel completion state illustrated in FIG. 4. Then, the system control circuit 50 stops energizing the second curtain coil 9 when the shutter time of seconds T1 obtained in step S119 has elapsed after stoppage of energizing the first curtain coil 5. Thus, the mechanical shutter 12 is brought into the second-curtain travel completion state illustrated in FIG. 5.

If the difference SUMtoi−SUMtcj between the energization time and the elapsed time is greater than the predetermined threshold "th" (e.g., threshold "th"≦30 sec), the system control circuit 50 performs the following control. Namely, the system control circuit 50 stops energizing the first curtain coil 5 at timing earlier than the above-described "shutter operation lag" by an amount $\alpha(t)$ (i.e., at the fall timing of a solid line representing "the first curtain coil" in FIG. 20).

Thus, the mechanical shutter 12 is brought into the first-curtain travel completion state illustrated in FIG. 4. Then, the system control circuit 50 stops energizing the second curtain coil 9 when the corrected shutter time of seconds T1+$\alpha(t)$ obtained in step S118 has elapsed after stoppage of energizing the first curtain coil 5. Thus, the mechanical shutter 12 is brought into the second-curtain travel completion state illustrated in FIG. 5.

The reason why the system control circuit 50 stops energizing the first curtain coil 5 at timing earlier than the "shutter operation lag" by an amount $\alpha(t)$ is as follows. If the difference SUMtoi−SUMtcj between the energization time and the elapsed time is greater than the predetermined threshold "th", the departure timing of the electromagnet for the second curtain changes (advances) due to heat generation in the electromagnet. Therefore, the system control circuit 50 stops energizing the first curtain coil 5 at earlier timing correspondingly.

[Example Operation of mechanical Shutter and Image Sensor in Live View Mode]

Figure 18:
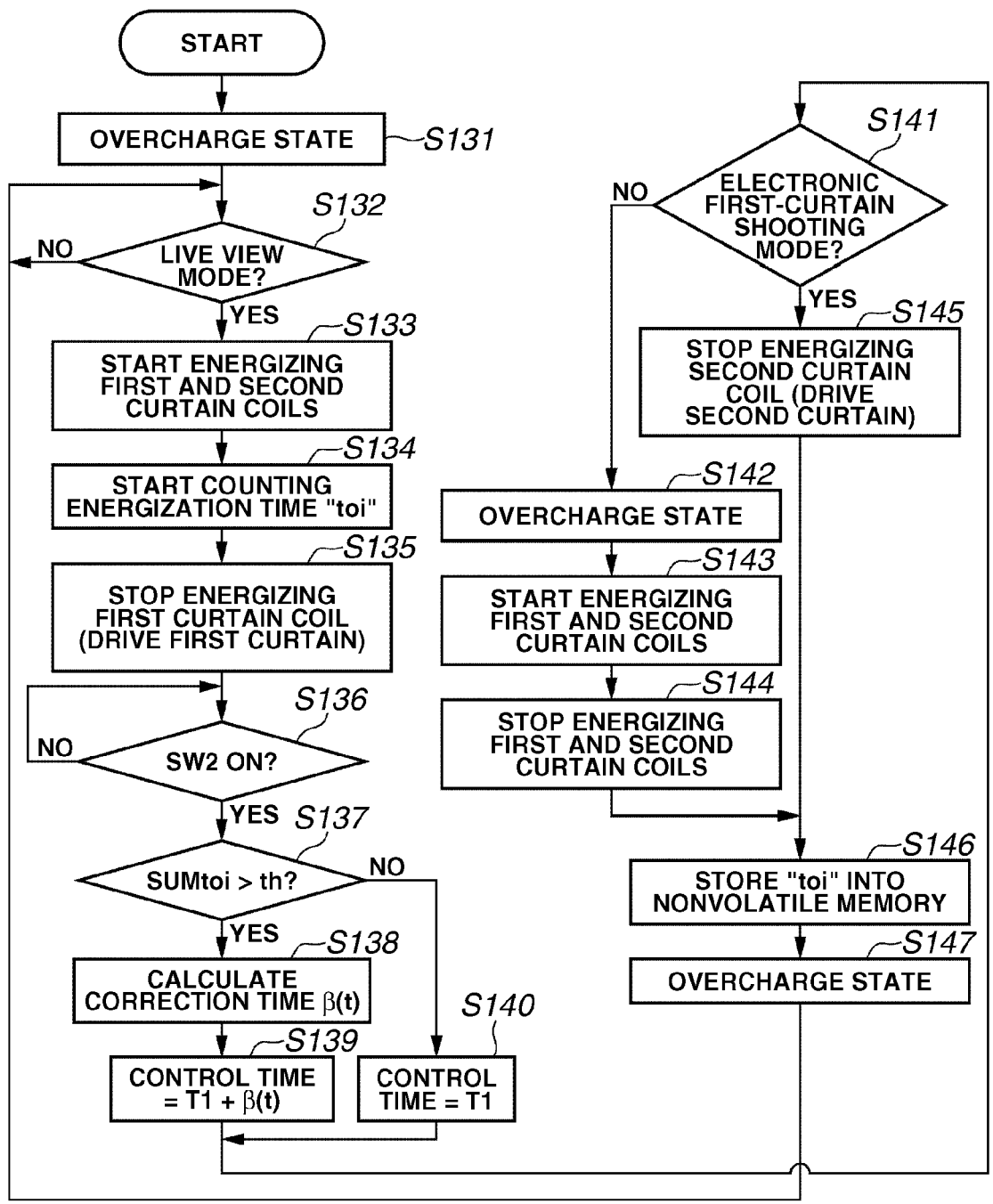
FIG. 18 is a flowchart illustrating an example shutter control operation in the live view mode for the focal-plane shutter according to the second exemplary embodiment of the present invention.

An example operation for the mechanical shutter 12 and the electronic first-curtain of the image sensor 14 in the live view mode using the EVF is described below with reference to FIGS. 2 to 5, 7, 18, 21, 22, 24A, and 24B. In the live view mode, the system control circuit 50 performs shutter control under the electronic first-curtain shooting mode or the mechanical first-curtain/mechanical second-curtain mode. FIG. 18 is a flowchart illustrating example processing for controlling the mechanical shutter 12 and the electronic first-curtain of the image sensor 14 in the live view mode.

In step S131, the system control circuit 50 sets the mechanical shutter 12 into the overcharge state illustrated in FIG. 2.

In step S132, the system control circuit 50 determines whether a user presses the live view mode button (one of the buttons provided on the operation unit 70), i.e., determines whether the live view mode is set.

If the system control circuit 50 determines that the live view mode is not set (NO in step S132), the system control circuit 50 repeats the determination processing with respect to the live view mode button. If the system control circuit 50 determines that the live view mode is set (YES in step S132), the control flow proceeds to step S133.

In step S133, the system control circuit 50 causes the quick return mirror 130 to rotate upward and starts energizing the first curtain coil 5 and the second curtain coil 9.

In step S134, the system control circuit 50 instructs the timer 58 to start counting the energization time "toi" for the second curtain coil 9. The charge lever 10 rotates in the counterclockwise direction. The first-curtain charge roller 2c and the second-curtain charge roller 6c separate from the cam portions 10b and 10c of the charge lever 10 as illustrated in FIG. 3 (i.e., the pre-travel standby state).

In step S135, the system control circuit 50 stops energizing the first curtain coil 5 to cause only the first curtain to travel. The mechanical shutter 12 is brought into the first-curtain travel completion state illustrated in FIG. 4, where the image sensor 14 can receive light from an object. In this state, the image sensor 14 performs capturing of an image and starts a live view operation. During the live view operation, the system control circuit 50 continues energizing the second curtain coil 9 to magnetically lock the second curtain.

In step S136, the system control circuit 50 determines whether the shutter switch 62 is pressed (i.e., whether the switch SW2 is turned on). If the system control circuit 50 determines that the switch SW2 is not turned on (NO in step S136), the system control circuit 50 repeats the determination processing with respect to the shutter switch 62 in step S136.

If the system control circuit 50 determines that the switch SW2 is turned on (YES in step S136), the control flow proceeds to step S137.

In step S137, the system control circuit 50 determines whether SUMtoi (i=1 to m) is greater than a predetermined threshold "th" (e.g., 30 sec), where SUMtoi represents a sum of the energization time for the second curtain coil 9 in the latest m (at least one) live view operations. In this case, "tom" (i.e., i=m) represents the energization time for the second curtain coil 9 in the present shooting operation, which is equal to the count value measured in step S134. If the system control circuit 50 determines that SUMtoi is greater than the predetermined threshold "th" (YES in step S137), the control flow proceeds to step S138.

In step S138, the system control circuit 50 calculates a correction time β(t).

In step S139, the system control circuit 50 adds the correction time (t) to an exposure time (i.e., shutter time of seconds) T1 that is set based on a photometric result obtained by the photometry control unit 46. In other words, the system control circuit 50 obtains a corrected shutter time of seconds T1+β(t). Namely, the system control circuit 50 can function as exposure time adjustment unit. In this embodiment, the system control circuit 50 calculates the correction time β(t) based on an energization time "to" according to the following functional equation (a correction function).

$$\beta(t)=C1(A(SUMtoi^{3i})+B(SUMtoi^{2i})+C(SUMtoi)+D)$$

where, i=1 to m and A, B, C, D, and C1 are time correction coefficients.

If the system control circuit 50 determines that SUMtoi (i=1 to m) is equal to or less than the predetermined threshold "th" (NO in step S137), the control flow proceeds to step S140.

In step S140, the system control circuit 50 does not correct (i.e., directly uses) the shutter time of seconds T1.

It is desirable that the threshold "th" for the SUMtoi (i.e. the sum of the energization time) is a value determined considering the temperature increase in the second curtain coil 9, which has an effect on the shutter accuracy.

Then, in step S141, the system control circuit 50 determines whether the electronic first-curtain shooting mode is set. If the system control circuit 50 determines that the electronic first-curtain shooting mode is not set (NO in step S141), namely if the mechanical first-curtain/mechanical second-curtain shooting mode is set, the control flow proceeds to step S142.

In step S142, the system control circuit 50 stops energizing the second curtain coil 9 to cause the second curtain to travel (i.e., the second-curtain travel completion state illustrated in FIG. 5). The charge lever 10 rotates in the clockwise direction while the cam portions 10b and 10c press the first-curtain charge roller 2c and the second-curtain charge roller 6c (i.e., performs the charge operation). Thus, the mechanical shutter 12 is brought into the overcharge state illustrated in FIG. 2.

In step S143, after completing the charge operation, the system control circuit 50 starts energizing the first curtain coil 5 and the second curtain coil 9. The charge lever 10 rotates in the counterclockwise direction. The first-curtain charge roller 2c and the second-curtain charge roller 6c separate from the camportions 10b and 10c of the charge lever 10 as illustrated in FIG. 3 (i.e., the pre-travel standby state).

In step S144, the system control circuit 50 successively stops energizing the first curtain coil 5 and the second curtain coil 9 according to the shutter time of seconds obtained in step S139 or S140, so that the image sensor 14 can be exposed to light from an object. If the shooting operation is completed, the control flow proceeds to step S146.

If the system control circuit 50 determines that the electronic first-curtain shooting mode is set (YES in step S141), the control flow proceeds to step S145.

In step S145, the system control circuit 50 resets the image sensor 14 (i.e., the electronic first-curtain). Furthermore, after the shutter time of seconds obtained in step S139 or S140 has elapsed, the system control circuit 50 stops energizing the second curtain coil 9 to shield the image sensor 14 from light. Then, the control flow proceeds to step S146.

In step S146, the system control circuit 50 stores the energization time "toi" for the second curtain coil 9 in the live view operation into the nonvolatile memory 56 (e.g., EEPROM).

In step S147, the system control circuit 50 sets the mechanical shutter 12 into the overcharge state. Then, the processing returns to step S132. As the live view mode is continuously set, the control flow proceeds to step S133, where the system control circuit 50 performs the above-described procedure to bring the mechanical shutter 12 into the first-curtain travel completion state illustrated in FIG. 4 and continues the live view operation.

If a user turns the power switch 72 off, the system control circuit 50 executes a reset operation for deleting the energization time "toi" stored in the nonvolatile memory 56 (e.g., EEPROM).

Figure 24A:
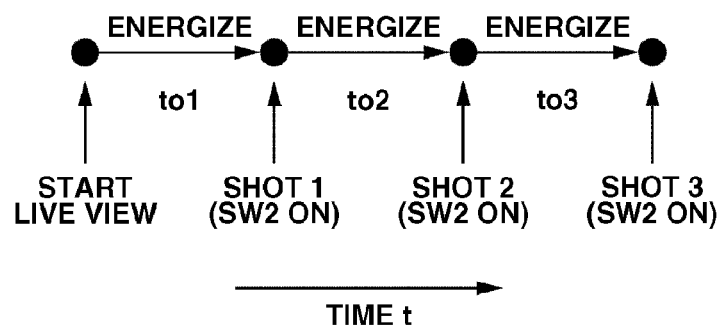
FIGS. 24A and 24B illustrate example energization time and example deenergization time (elapsed time) for the second curtain coil in the live view mode of the focal-plane shutter according to the second exemplary embodiment of the present invention.

FIG. 24A illustrates an example camera operation in the live view shooting mode using the EVF, wherein the abscissa axis represents time t. In this case, at respective shots 1 to 3, the following expression can be used for the left side of the determination formula used in step S137 in FIG. 18:

| | |
|---|---|
| to1 | Shot 1 |
| to1+to2 | Shot 2 |
| to1+to2+to3 | Shot 3 |

In this case, the deenergization time for the second curtain coil 9 is sufficiently short in the live view operation and is negligible.

Figure 21:
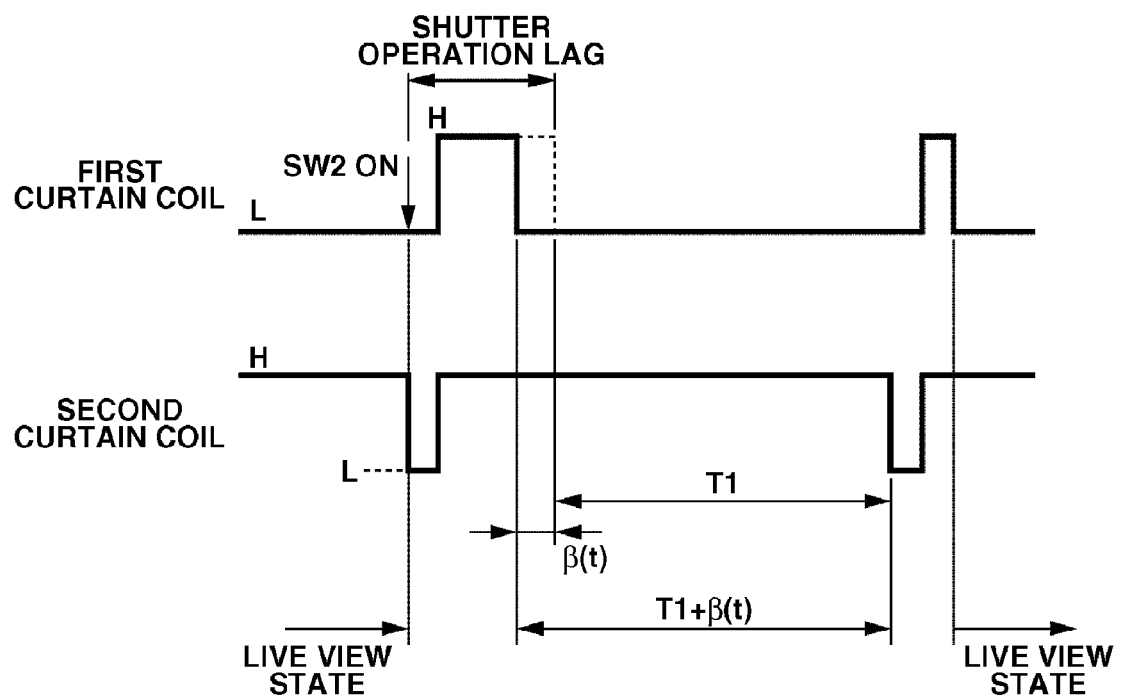
FIG. 21 is a time diagram illustrating example voltage control for the mechanical first-curtain and the mechanical second-curtain of the focal-plane shutter in the live view mode according to the second exemplary embodiment of the present invention.

FIG. 21 is a time diagram illustrating an example voltage control operation for the first curtain and the second curtain of the mechanical shutter 12 performed in step S144.

If the switch SW2 of the shutter switch 62 is turned on in the live view state (i.e., in the first-curtain travel completion state illustrated in FIG. 4), the system control circuit 50 stops energizing the second curtain coil 9 (performs a charge operation). Then, the system control circuit 50 starts energizing the first curtain coil 5 and the second curtain coil 9 to release the charge lever 10. Thus, the mechanical shutter 12 is brought into the pre-travel standby state illustrated in FIG. 3.

If the value SUMtoi (i=1 to m) (i.e., the sum of the energization time for the second curtain coil 9 in the latest "m" live view operations) is equal to or less than the predetermined threshold "th" (e.g., threshold "th"≦30 sec), the system control circuit 50 performs the following control. Namely, the system control circuit 50 stops energizing the first curtain coil 5 when a predetermined time (i.e., "shutter operation lag") has elapsed after turning-on of the switch SW2 (i.e., at the fall timing of a dotted line representing "the first curtain coil" in FIG. 21).

Thus, the mechanical shutter 12 is brought into the first-curtain travel completion state illustrated in FIG. 4. Then, the system control circuit 50 stops energizing the second curtain coil 9 when the shutter time of seconds T1 obtained in step S140 has elapsed after stoppage of energizing the first curtain coil 5. Thus, the mechanical shutter 12 is brought into the second-curtain travel completion state illustrated in FIG. 5.

If the value SUMtoi (i=1 to m) (i.e., the sum of the energization time for the second curtain coil 9 in the latest "m" live view operations) is greater than the predetermined threshold "th", the system control circuit 50 performs the following control. Namely, the system control circuit 50 stops energizing the first curtain coil 5 at timing earlier than the above-described "shutter operation lag" by an amount (t) (i.e., at the fall timing of a solid line representing "the first curtain coil" in FIG. 21).

Thus, the mechanical shutter 12 is brought into the first-curtain travel completion state illustrated in FIG. 4. Then, the system control circuit 50 stops energizing the second curtain coil 9 when the corrected shutter time of seconds $T1+\beta(t)$ obtained in step S139 has elapsed after stoppage of energizing the first curtain coil 5. Thus, the mechanical shutter 12 is brought into the second-curtain travel completion state illustrated in FIG. 5.

Next, the system control circuit 50 performs the charge operation to realize the overcharge state illustrated in FIG. 2. Then, the system control circuit 50 starts energizing the first curtain coil 5 and the second curtain coil 9 to release the charge lever 10 (i.e., the pre-travel standby state illustrated in FIG. 3). After a predetermined time has elapsed, the system control circuit 50 stops energizing the first curtain coil 5 to bring the mechanical shutter 12 into the first-curtain travel completion state illustrated in FIG. 4. In this state, the image sensor 14 captures an image to restart the live view operation.

Figure 22:
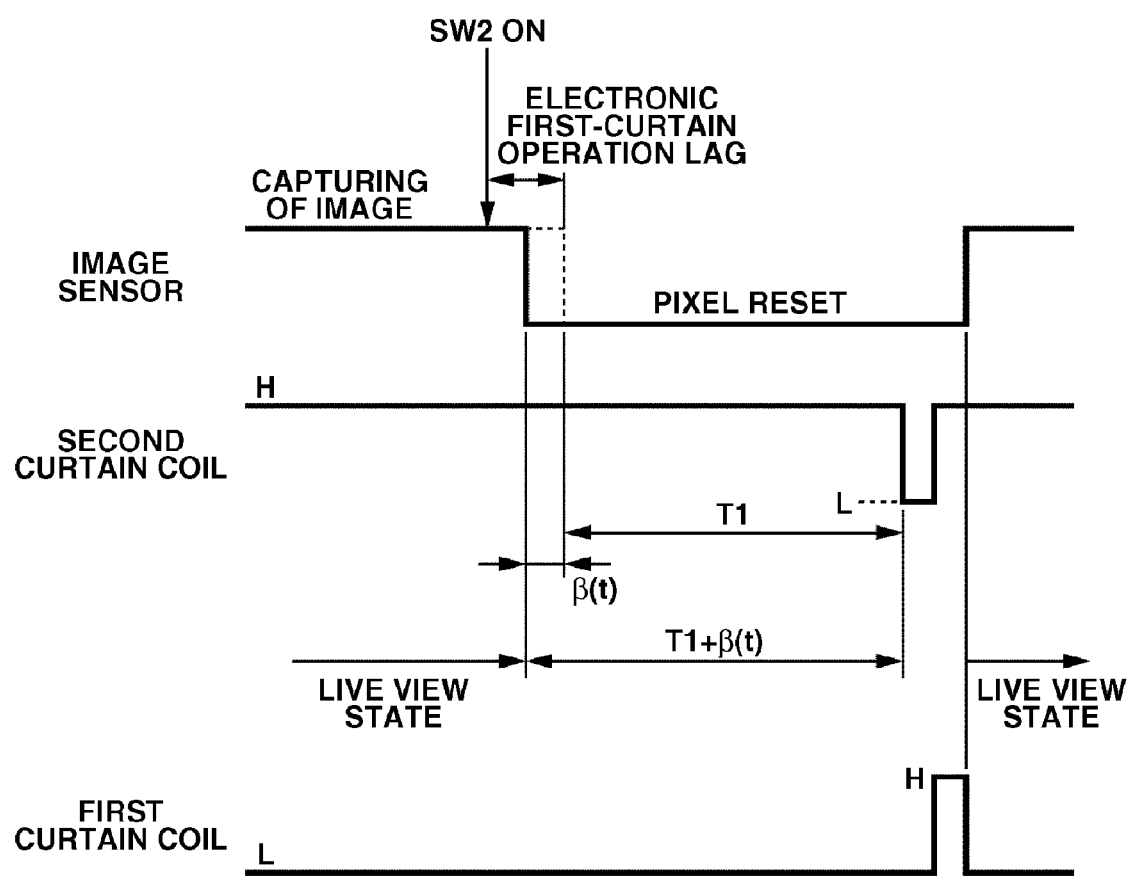
FIG. 22 is a time diagram illustrating example voltage control for the mechanical first-curtain and the mechanical second-curtain of the focal-plane shutter and example control for the image sensor (electronic first-curtain) in the live view mode according to the second exemplary embodiment of the present invention.

FIG. 22 is a time diagram illustrating an example voltage control operation for the electronic first-curtain and the mechanical second-curtain performed in step S145. If the switch SW2 of the shutter switch 62 is turned on in the live view state (i.e., in the first-curtain travel completion state illustrated in FIG. 4), the system control circuit 50 performs the following operations.

First, if the value SUMtoi (i=1 to m) (i.e., the sum of the energization time for the second curtain coil 9 in the latest m (at least one) live view operations) is equal to or less than the predetermined threshold "th" (e.g., threshold "th"≦30 sec), the system control circuit 50 performs the following control. Namely, the system control circuit 50 starts pixel reset scanning (travel of the electronic first-curtain) for the image sensor 14 when a predetermined time (hereafter, referred to as "electronic first-curtain operation lag") has elapsed after turning-on of the switch SW2 (i.e., at the fall timing of a dotted line representing "the image sensor" in FIG. 22). Then, if the shutter time of seconds T1 obtained in step S140 has elapsed after starting the travel of the electronic first-curtain, the system control circuit 50 stops energizing the second curtain coil 9. Thus, the mechanical shutter 12 is brought into the second-curtain travel completion state illustrated in FIG. 5.

If the value SUMtoi (i=1 to m) (i.e., the sum of the energization time for the second curtain coil 9 in the latest m (at least one) live view operations) is greater than the predetermined threshold "th" (e.g., threshold "th"≦30 sec), the system control circuit 50 performs the following control. The system control circuit 50 starts the reset scanning (travel of the electronic first-curtain) for the image sensor 14 at timing earlier than the above-described "electronic first-curtain operation lag" by an amount (t) (i.e., at the fall timing of a solid line representing "the image sensor" in FIG. 22). Then, if the shutter time of seconds $T1+\beta(t)$ obtained in step S139 has elapsed after starting the travel of the electronic first-curtain, the system control circuit 50 stops energizing the second curtain coil 9. Thus, the mechanical shutter 12 is brought into the second-curtain travel completion state illustrated in FIG. 5.

Next, the system control circuit 50 performs the charge operation to realize the overcharge state illustrated in FIG. 2. Then, the system control circuit 50 starts energizing the first curtain coil 5 and the second curtain coil 9 to release the charge lever 10 (i.e., the pre-travel standby state illustrated in FIG. 3). After a predetermined time has elapsed, the system control circuit stops energizing the first curtain coil 5 to bring the mechanical shutter 12 into the first-curtain travel completion state illustrated in FIG. 4. In this state, the image sensor 14 captures an image to restart the live view operation.

[Example Operation of Mechanical Shutter in Shooting Operation Following Live View State]

Figure 19:
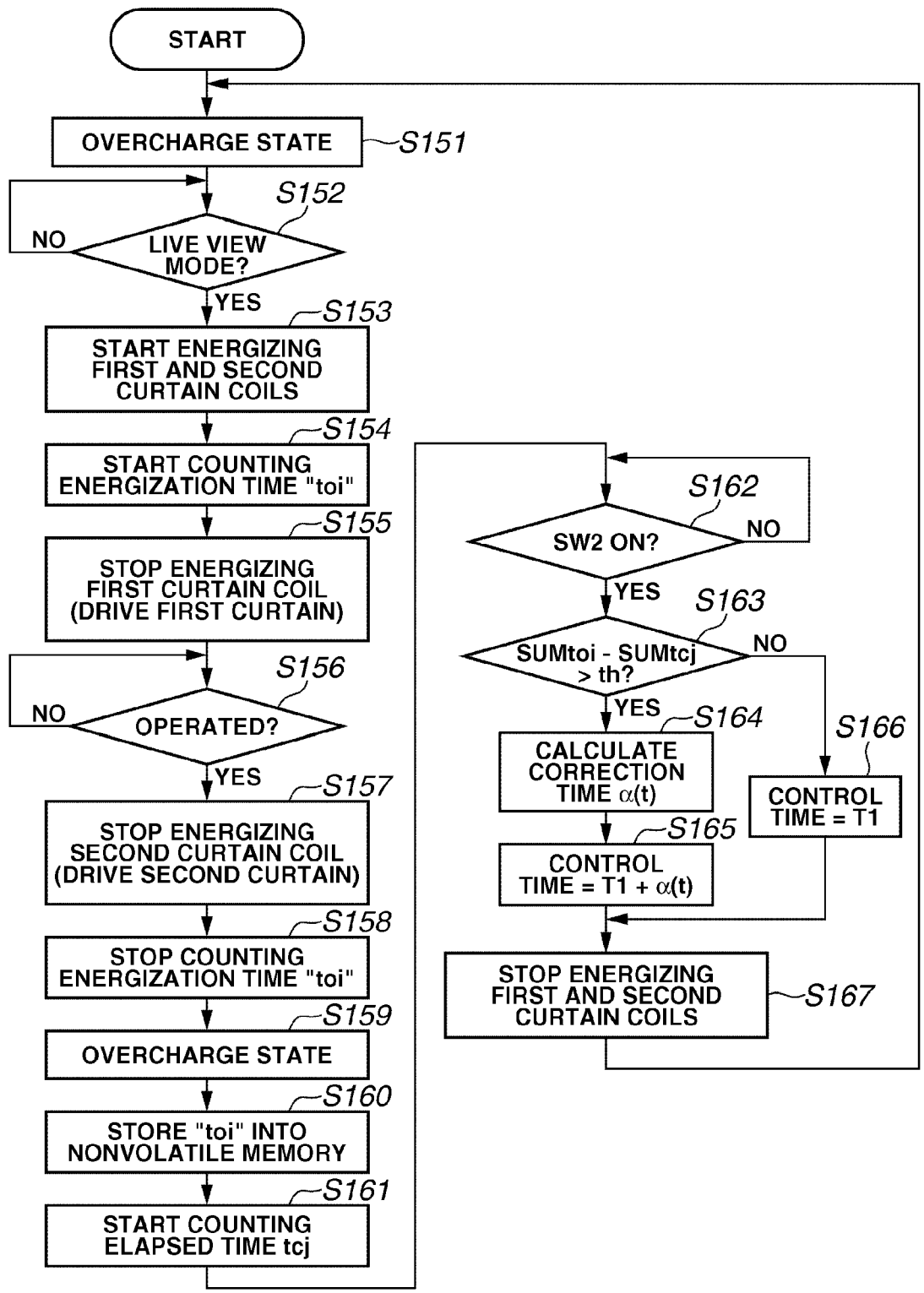
FIG. 19 is a flowchart illustrating an example shutter control operation in a live view cancelled state for the focal-plane shutter according to the second exemplary embodiment of the present invention.

Next, an example operation for the mechanical shutter 12 in a shooting operation following the live view state using the EVF (i.e., in the live view cancelled state) is described below with reference to FIGS. 2 to 5, 19, 24A, and 24B. FIG. 19 is a flowchart illustrating example processing for controlling the mechanical shutter 12 in the live view cancelled state following the live view state.

In step S151, the system control circuit 50 sets the mechanical shutter 12 into the overcharge state illustrated in FIG. 2.

In step S152, the system control circuit 50 determines whether a user presses the live view mode button (one of the buttons provided on the operation unit 70), i.e., determines whether the live view mode is set. If the system control circuit 50 determines that the live view mode is not set (NO in step S152), the system control circuit 50 repeats the determination processing with respect to the live view mode button. If the system control circuit 50 determines that the live view mode is set (YES in step S152), the control flow proceeds to step S153.

In step S153, the system control circuit 50 causes the quick return mirror 130 to rotate upward and starts energizing the first curtain coil 5 and the second curtain coil 9.

In step S154, the system control circuit 50 instructs the timer 58 to start counting the energization time "toi" for the second curtain coil 9. The charge lever 10 rotates in the counterclockwise direction. The first-curtain charge roller 2c and the second-curtain charge roller 6c separate from the cam portions 10b and 10c of the charge lever 10 as illustrated in FIG. 3 (i.e., the pre-travel standby state).

In step S155, the system control circuit 50 stops energizing the first curtain coil 5 to cause only the first curtain to travel. The mechanical shutter 12 is brought into the first-curtain travel completion state illustrated in FIG. 4, where the image sensor 14 can receive light from an object. In this state, the image sensor 14 performs capturing of an image and starts a live view operation. During the live view operation, the system control circuit 50 continues energizing the second curtain coil 9 to magnetically lock the second curtain.

In step S156, the system control circuit 50 determines whether an operation member of the operation unit 70 is operated. If the system control circuit 50 determines that the operation member of the operation unit 70 is not operated (NO in step S156), the system control circuit 50 continues the live view operation. If the system control circuit 50 determines that the operation member of the operation unit 70 is operated (YES in step S156), the control flow proceeds to step S157.

In step S157, the system control circuit 50 stops energizing the second curtain coil 9 to cause the second curtain to travel (i.e., the second-curtain travel completion state illustrated in FIG. 5).

Next, in step S158, the system control circuit 50 instructs the timer 58 to stop counting the energization time "toi" for the second curtain coil 9.

In step S159, the system control circuit 50 performs the charge operation to realize the overcharge state illustrated in FIG. 2.

In step S160, the system control circuit 50 stores the energization time "toi" during execution of the live view operation into the nonvolatile memory 56 (e.g., EEPROM).

In step S161, the system control circuit 50 instructs the timer 58 to start counting an elapsed time "tcj" after stopping energizing the second curtain coil 9.

In step S162, the system control circuit 50 determines whether the shutter switch 62 is pressed in the overcharge state, (i.e., determines whether the switch SW2 is turned on). If a user does not press the switch SW2 (NO in step S162), the system control circuit 50 repeats the determination processing with respect to the shutter switch 62 in step S162. If the switch SW2 is turned on, the control flow proceeds to step S163.

In step S163, the system control circuit 50 performs the following processing. First, the system control circuit 50 obtains a sum SUMtoi (i=1 to m) of the energization time for the second curtain coil 9 in the latest m (at least one) shooting operations. In this case, "tom" (i.e., i=m) represents an estimated energization time for the second curtain coil 9 in the present shooting operation, which is equal to the shutter time of seconds T1.

Next, the system control circuit 50 obtains a sum SUMtcj (j=1 to m−1) of elapsed time which represents a period of time having elapsed before the system control circuit 50 restarts energizing the second curtain coil 9 for the next shooting operation after completing the latest m−1 (at least one) shooting operations (i.e., from the timing the system control circuit 50 once stops energizing the second curtain coil 9).

Then, the system control circuit 50 calculates a difference SUMtoi−SUMtcj (i=1 to m and j=1 to m−1) between two sums. The system control circuit 50 determines whether the difference SUMtoi−SUMtcj is greater than a predetermined threshold "th" (e.g., 30 sec). If the system control circuit 50 determines that the difference SUMtoi−SUMtcj is greater than the predetermined threshold "th" (YES in step S163), the control flow proceeds to step S164. In step S164, the system control circuit 50 calculates a correction time α(t).

In step S165, the system control circuit 50 adds the correction time α(t) to an exposure time (i.e., shutter time of seconds) T1 that is set based on a photometric result obtained by the photometry control unit 46. In other words, the system control circuit 50 obtains a corrected shutter time of seconds T1+α(t). Namely, the system control circuit 50 can function as exposure time adjustment unit. In this embodiment, the system control circuit 50 calculates the correction time α(t) based on an energization time "to" and an elapsed time "tc" according to the following functional equation (a correction function).

$$\alpha(t) = C1(A(\text{SUM}toi^3) + B(\text{SUM}toi^2) + C(\text{SUM}toi) + D) - C2\,\text{Ln}(\text{SUM}tcj)$$

where i=1 to m and j=1 to m−1, while A, B, C, D, C1, and C2 are time correction coefficients.

If the system control circuit 50 determines that the difference SUMtoi−SUMtcj (i=1 to m and j=1 to m−1) is equal to or less than the predetermined threshold "th" (NO in step S163), the control flow proceeds to step S166. In step S166, the system control circuit 50 does not correct (i.e., directly uses) the shutter time of seconds T1.

It is desirable that the threshold "th" for the difference SUMtoi−SUMtcj between the energization time and the elapsed time is a value determined considering the temperature increase in the second curtain coil 9, which has an effect on the shutter accuracy.

Then, in step S167, the system control circuit 50 successively stops energizing the first curtain coil 5 and the second curtain coil 9 according to the shutter time of seconds obtained in step S165 or S166, so that the image sensor 14 can be exposed to light from an object. If a user completes the shooting operation, the system control circuit 50 causes the charge lever 10 to rotate in the clockwise direction while the cam portions 10*b* and 10*c* press the first-curtain charge roller 2*c* and the second-curtain charge roller 6*c* (i.e., performs the charge operation). Thus, the mechanical shutter 12 is brought into the overcharge state illustrated in FIG. 2 (step S151).

If in step S161 the elapsed time "tcj" is greater than a predetermined time "tcmax" (e.g., 30 min), the system control circuit 50 executes a reset operation for deleting the energization time "toi" and the elapsed time "tcj" stored in the nonvolatile memory 56 (e.g., EEPROM). Similarly, if a user turns the power switch 72 off, the system control circuit 50 executes a reset operation for deleting the energization time "toi" and the elapsed time "tcj" stored in the nonvolatile memory 56 (e.g., EEPROM).

Figure 24B:
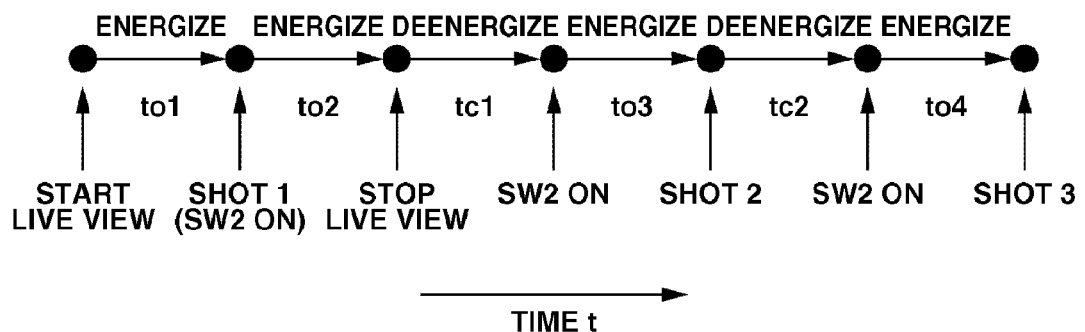

FIG. 24B illustrates an example camera operation in a live view mode using the EVF and in a succeeding shooting mode using the optical finder in a live view canceled state, wherein the abscissa axis represents time t. In this case, at respective shots 1 to 3, the following expression can be used for the left side of the determination formula used in step S163 in FIG. 19:

| | |
|---|---|
| to1 | Shot 1 |
| to1+to2+to3−tc1 | Shot 2 |
| to1+to2+to3+to4−(tc1+tc2) | Shot 3 |

In this case, the deenergization time for the second curtain coil 9 is sufficiently short in the live view operation and is negligible.

Figure 25:
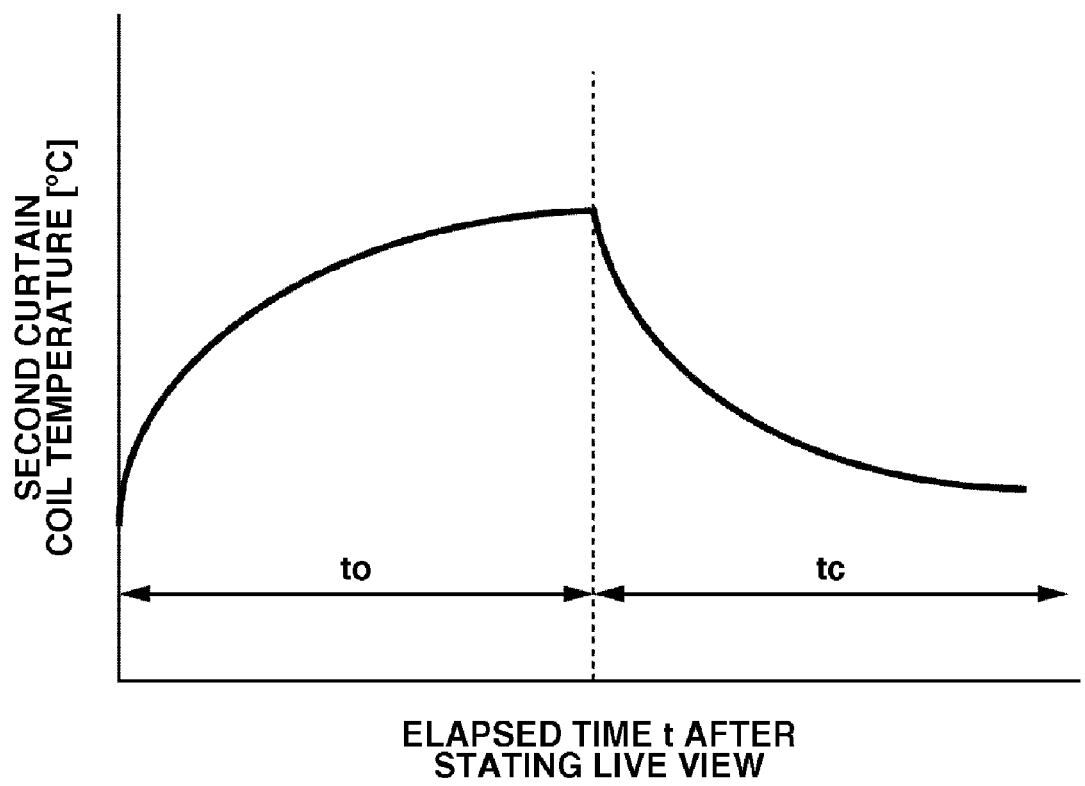
FIG. 25 is a graph illustrating the temperature of the second curtain coil that changes after starting energizing the second curtain coil in the focal-plane shutter according to the second exemplary embodiment of the present invention.

FIG. 25 illustrates the temperature of the second curtain coil 9 that changes according to the energization time "to" for the second curtain coil 9 and the elapsed time tc (i.e., a time interval from stoppage to restart of energizing the second curtain coil 9).

In FIG. 25, the abscissa axis represents time t [s] after starting the live view operation and the ordinate axis represents the temperature of the second curtain coil 9 [° C.]. The temperature of the second curtain coil 9 increases according to the energization time "to" for the second curtain coil 9, like a third-order function. On the other hand, the temperature of the second curtain coil 9 decreases logarithmically according to the elapsed time tc (i.e., a time interval from cancellation of the live view operation to restart of energizing the second curtain coil 9).

Figure 26:
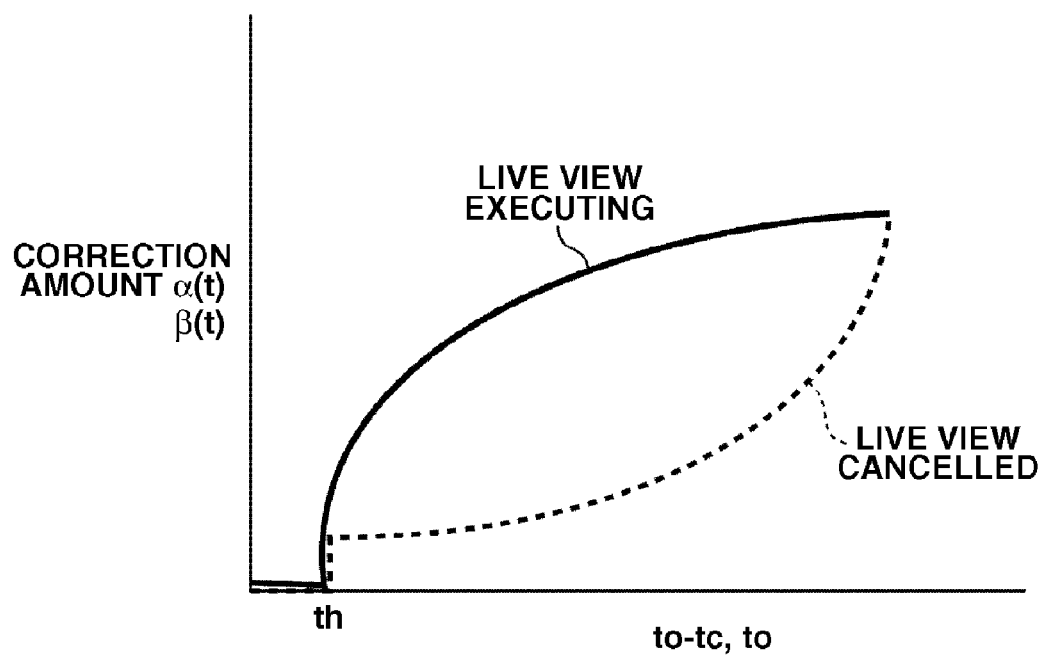
FIG. 26 is a graph illustrating correction amounts α(t) and β(t) for the shutter control time (shutter operation lag) that change according to the energization time for the second curtain coil and a difference between the energization time for the second curtain coil and an elapsed time (i.e., time interval from stoppage of energization to restart of energization to the second curtain coil) in the focal-plane shutter according to the second exemplary embodiment of the present invention.

FIG. 26 illustrates the correction amount for the shutter time of seconds that changes according to the energization time "to" of the second curtain coil 9 and the elapsed time tc (i.e., a time interval from stoppage to restart of energizing the second curtain coil 9).

In FIG. 26, the abscissa axis represents energization time "to" for the second curtain coil 9 or time difference "to-tc" between the energization time "to" for the second curtain coil 9 and the elapsed time "tc" (i.e., time interval from stop to restart of energizing the second curtain coil 9). The ordinate axis represents the correction amount $\beta(t)$ or $\alpha((t)$ for the shutter time of seconds. Furthermore, the solid line indicates the correction amount for the shutter time of seconds during execution of the live view operation. The dotted line indicates the correction amount for the shutter time of seconds in the live view cancelled state.

During execution of the live view operation (solid line in FIG. 26), if the time "to" or the time difference "to-tc" is equal to or less than the threshold "th", the correction amount (t) or $\alpha(t)$ for the shutter time is set to 0. On the other hand, if the time "to" or the time difference "to-tc" is greater than the threshold th, the correction amount (t) or $\alpha(t)$ for the shutter time increases according to the time "to" or the time difference "to-tc", like a third-order function.

In the live view cancelled state (dotted line in FIG. 26), if the time "to" or the time difference "to-tc" is greater than the threshold th, the correction amount (t) or $\alpha(t)$ for the shutter time decreases logarithmically according to the time "to" or the time difference "to-tc." On the other hand, if the time "to" or the time difference "to-tc" is equal to or less than the threshold "th", the correction amount $\beta(t)$ or $\alpha(t)$ for the shutter time is set to 0.

According to the examples illustrated in FIGS. 25 and 26, the live view operation is performed continuously without any interruption and is not restarted if it is cancelled (i.e., after stopping energizing the second curtain).

If the live view operation (or shooting operation) continues for a long time, the temperature of the second curtain coil 9 increases and the electric resistance of the second curtain coil 9 increases correspondingly, as illustrated in FIG. 25. If the resistance increases, the current flowing through the second curtain coil 9 decreases. The second curtain armature 7 and the second curtain yoke 8 separate from each other at earlier timing (with a short time lag). On the other hand, electric power is not supplied to the first curtain coil 5. Therefore, the temperature of the first curtain coil 5 does not increase. The timing the first curtain armature 3 and the first curtain yoke 4 separate from each other (i.e., time lag) does not change if the ambient temperature is constant. Therefore, the actual exposure time becomes shorter.

Hence, as illustrated in FIGS. 17 to 19, the system control circuit 50 determines the correction amounts $\alpha(t)$ and $\beta(t)$ for the shutter control time (i.e., shutter operation lag) according to the energization time "to" for the second curtain coil 9 and the elapsed time "tc" (i.e., time interval from stop to restart of energizing the second curtain coil 9).

The correction amounts $\alpha(t)$ and $\beta(t)$ for the shutter control time (i.e., shutter operation lag) can be expressed as a correction function that is defined by the energization time "to" and the elapsed time "tc" considering the temperature increase in the second curtain coil 9. Therefore, the system control circuit 50 using the value defined by the correction function can perform an accurate exposure control operation using the timer 58 (without providing a thermometer in the vicinity of the second curtain coil 9) even after completing the live view operation, in which the shutter opens for a long time.

Other Exemplary Embodiments

Furthermore, as described above, an exemplary embodiment uses the predetermined threshold "th" for the difference SUMtoi−SUMtcj (i=1 to m and j=1 to m−1) between the energization time and the elapsed time. Thus, the system control circuit 50 can appropriately determine the necessity of the shutter operation lag correction even after completing intermittent live view operations and intermittent shooting operations.

Moreover, in an exemplary embodiment, the correction amounts $\alpha(t)$ and $\beta(t)$ for the shutter control time (i.e., shutter operation lag) can be expressed as a correction function that is defined by the SUMtoi (i=1 to m) (i.e., a sum of the energization time) and the SUMtcj (j=1 to m−1) (i.e., a sum of the elapsed time). Thus, the system control circuit 50 can perform an accurate exposure control operation even after completing intermittent live view operations and intermittent shooting operations.

An exemplary embodiment performs an exposure time correction by performing correction for the shutter control time (i.e., shutter operation lag). However, according to another embodiment, if an image is captured without changing the shutter control time (i.e., shutter operation lag), the system control circuit 50 (i.e., gain adjustment unit) can adjust a gain value used in the image processing circuit 20 (in the development process) by an amount corresponding to a correction amount for the shutter control time.

Furthermore, in the above-described exemplary embodiment, the mechanical shutter 12 includes both the first curtain and the second curtain while usage of the mechanical first-curtain and usage of the electronic first-curtain are selectable. The present invention is not limited to the above-described embodiment. In an exemplary embodiment, the mechanical shutter 12 can include only the second curtain and can constantly use the electronic first-curtain.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-110834 filed Apr. 19, 2007, which is hereby incorporated by reference herein in its entirety.

What is claimed is:

1. An imaging apparatus comprising:
   an image sensor configured to capture an image of an object;
   a mechanical shutter including a second curtain and a second-curtain holding mechanism configured to electromagnetically hold the second curtain at an initial position prior to a travel;
   a first temperature sensor disposed within a predetermined range from the second-curtain holding mechanism and configured to measure temperature;
   a second temperature sensor disposed outside the predetermined range from the second-curtain holding mechanism and configured to measure temperature;
   an adjustment unit configured to adjust time which is between a point starting an exposure of the image sensor and until releasing a power distribution to the second-curtain holding mechanism, if a temperature difference between temperatures detected by the first temperature sensor and the second temperature sensor is greater than a predetermined threshold, wherein the time is based on a brightness of the object; and an exposure control unit configured to perform exposure control for the image sensor based on the time adjusted by the adjustment unit if the temperature difference is greater than the predetermined threshold.

2. The imaging apparatus according to claim 1, wherein the mechanical shutter further includes a first curtain and a first-curtain holding mechanism configured to electromagnetically hold the first curtain at an initial position prior to a travel, and wherein the exposure control unit performs exposure control for the image sensor by starting the exposure of the image sensor by traveling the first curtain and completing the exposure of the image sensor by traveling the second curtain.

3. The imaging apparatus according to claim 2, wherein the second temperature sensor is positioned within a predetermined range from the first-curtain holding mechanism.

4. The imaging apparatus according to claim 1, wherein the exposure control unit performs exposure control for the image sensor by controlling resetting the image sensor and starting the exposure of the image sensor and completing the exposure of the image sensor by traveling the second curtain.

5. The imaging apparatus according to claim 1, wherein the temperature difference is a temperature difference between a temperature detected by the second temperature sensor during an electronic first-curtain adjustment for the image sensor and a temperature detected by the first temperature sensor when a shooting operation is instructed.

6. The imaging apparatus according to claim 1, wherein the adjustment unit increases the time as greater as the temperature difference is, if the temperature difference is greater than the predetermined threshold.

7. An imaging apparatus comprising:

an image sensor configured to capture an image of an object to generate an electric signal;

a mechanical shutter including a second curtain and a second-curtain holding mechanism configured to electromagnetically hold the second curtain at an initial position prior to a travel;

a first temperature sensor disposed within a predetermined range from the second-curtain holding mechanism and configured to measure temperature;

a second temperature sensor disposed outside the predetermined range from the second-curtain holding mechanism and configured to measure temperature;

an image processing circuit configured to perform a gain correction using a predetermined gain value for the electric signal generated by the image sensor; and an adjustment unit configured to adjust the gain value used in the image processing circuit according to a temperature difference between temperatures detected by the first temperature sensor and the second temperature sensor if the temperature difference is greater than a predetermined threshold.

8. The imaging apparatus according to claim 7, wherein the mechanical shutter further includes a first curtain and a first-curtain holding mechanism configured to electromagnetically hold the first curtain at an initial position prior to a travel, and wherein the second temperature sensor is positioned within a predetermined range from the first-curtain holding mechanism.

9. The imaging apparatus according to claim 7, wherein further comprising an exposure control unit configured to perform exposure control for the image sensor by controlling reset timing of the image sensor and travel timing of the second curtain, and wherein the temperature difference is a temperature difference between a temperature detected by the second temperature sensor during an electronic first-curtain adjustment for the image sensor and a temperature detected by the first temperature sensor when a shooting operation is instructed.

10. The imaging apparatus according to claim 7, wherein the adjustment unit increases the gain value as greater as the temperature difference is, if the temperature difference is greater than the predetermined threshold.

11. A method for controlling an imaging apparatus including an image sensor configured to capture an image of an object, a mechanical shutter including a second curtain and a second-curtain holding mechanism configured to electromagnetically hold the second curtain at an initial position prior to a travel, a first temperature sensor disposed within a predetermined range from the second-curtain holding mechanism and configured to measure temperature, and a second temperature sensor disposed outside the predetermined range from the second-curtain holding mechanism and configured to measure temperature, the method comprising:

adjusting time which is between a point starting an exposure of the image sensor and until releasing a power distribution to the second-curtain holding mechanism, if a temperature difference between temperatures detected by the first temperature sensor and the second temperature sensor is greater than a predetermined threshold, wherein the time is based on a brightness of the object; and performing exposure control for the image sensor based on the adjusted time if the temperature difference is greater than the predetermined threshold.

12. A method for controlling an imaging apparatus including an image sensor configured to capture an image of an object to generate an electric signal, a mechanical shutter including a second curtain and a second-curtain holding mechanism configured to electromagnetically hold the second curtain at an initial position prior to a travel, a first temperature sensor disposed within a predetermined range from the second-curtain holding mechanism and configured to measure temperature, and a second temperature sensor disposed outside the predetermined range from the second-curtain holding mechanism and configured to measure temperature, the method comprising:

performing a gain correction using a predetermined gain value for the electric signal generated by the image sensor; and adjusting the gain value to be used for gain correction according to a temperature difference between temperatures detected by the first temperature sensor and the second temperature sensor if the temperature difference is greater than a predetermined threshold.

13. An imaging apparatus comprising:

an image sensor configured to capture an image of an object;

a mechanical shutter including a curtain and a curtain holding mechanism configured to electromagnetically hold the curtain at an initial position prior to a travel;

a first temperature sensor disposed within a predetermined range from the curtain holding mechanism and configured to measure temperature;

a second temperature sensor disposed outside the predetermined range from the curtain holding mechanism and configured to measure temperature;

an adjustment unit configured to adjust time which is between a point starting an exposure of the image sensor and until releasing a power distribution to the curtain holding mechanism, if a temperature difference between temperatures detected by the first temperature sensor and the second temperature sensor is greater than a predetermined threshold, wherein the time is based on a brightness of the object; and an exposure control unit configured to perform exposure control for the image sensor based on the time adjusted by the adjustment unit if the temperature difference is greater than the predetermined threshold.

14. The imaging apparatus according to claim 13, wherein the exposure control unit performs exposure control for the image sensor by controlling resetting the image sensor and starting the exposure of the image sensor and completing the exposure of the image sensor by traveling the curtain.

15. The imaging apparatus according to claim 13, wherein the temperature difference is a temperature difference between a temperature detected by the second temperature sensor during an electronic curtain adjustment for the image sensor and a temperature detected by the first temperature sensor when a shooting operation is instructed.

16. The imaging apparatus according to claim 13, wherein the adjustment unit increases the time as greater as the temperature difference is, if the temperature difference is greater than the predetermined threshold.

17. An imaging apparatus comprising:
an image sensor configured to capture an image of an object to generate an electric signal;
a mechanical shutter including a curtain and a curtain holding mechanism configured to electromagnetically hold the curtain at an initial position prior to a travel;
a first temperature sensor disposed within a predetermined range from the curtain holding mechanism and configured to measure temperature;
a second temperature sensor disposed outside the predetermined range from the curtain holding mechanism and configured to measure temperature;
an image processing circuit configured to perform a gain correction using a predetermined gain value for the electric signal generated by the image sensor; and
an adjustment unit configured to adjust the gain value used in the image processing circuit according to a temperature difference between temperatures detected by the first temperature sensor and the second temperature sensor if the temperature difference is greater than a predetermined threshold.

18. The imaging apparatus according to claim 17, further comprising an exposure control unit configured to perform exposure control for the image sensor by controlling reset timing of the image sensor and travel timing of the curtain, and wherein the temperature difference is a temperature difference between a temperature detected by the second temperature sensor during an electronic curtain adjustment for the image sensor and a temperature detected by the first temperature sensor when a shooting operation is instructed.

19. The imaging apparatus according to claim 17, wherein the adjustment unit increases the gain value as greater as the temperature difference is, if the temperature difference is greater than the predetermined threshold.

20. A method for controlling an imaging apparatus including an image sensor configured to capture an image of an object, a mechanical shutter including a curtain and a curtain holding mechanism configured to electromagnetically hold the curtain at an initial position prior to a travel, a first temperature sensor disposed within a predetermined range from the curtain holding mechanism and configured to measure temperature, and a second temperature sensor disposed outside the predetermined range from the curtain holding mechanism and configured to measure temperature, the method comprising:
adjusting time which is between a point starting an exposure of the image sensor and until releasing a power distribution to the curtain holding mechanism, if a temperature difference between temperatures detected by the first temperature sensor and the second temperature sensor is greater than a predetermined threshold, wherein the time is based on a brightness of the object; and
performing exposure control for the image sensor based on the adjusted time if the temperature difference is greater than the predetermined threshold.

21. A method for controlling an imaging apparatus including an image sensor configured to capture an image of an object to generate an electric signal, a mechanical shutter including a curtain and a curtain holding mechanism configured to electromagnetically hold the curtain at an initial position prior to a travel, a first temperature sensor disposed within a predetermined range from the curtain holding mechanism and configured to measure temperature, and a second temperature sensor disposed outside the predetermined range from the curtain holding mechanism and configured to measure temperature, the method comprising:
performing a gain correction using a predetermined gain value for the electric signal generated by the image sensor; and
adjusting the gain value to be used for gain correction according to a temperature difference between temperatures detected by the first temperature sensor and the second temperature sensor if the temperature difference is greater than a predetermined threshold.

* * * * *